(12) United States Patent
Schardt et al.

(10) Patent No.: US 7,719,532 B2
(45) Date of Patent: May 18, 2010

(54) EFFICIENT AND FLEXIBLE DATA ORGANIZATION FOR ACCELERATION DATA STRUCTURE NODES

(75) Inventors: Paul Emery Schardt, Rochester, MN (US); Robert Allen Shearer, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 540 days.

(21) Appl. No.: 11/673,041

(22) Filed: Feb. 9, 2007

(65) Prior Publication Data
US 2008/0192050 A1   Aug. 14, 2008

(51) Int. Cl.
*G06T 15/00* (2006.01)
(52) U.S. Cl. .................. 345/420; 345/427; 382/176; 382/180; 382/305; 701/207; 701/208; 707/1; 707/100; 707/102
(58) Field of Classification Search .............. 345/420, 345/427; 707/1, 4, 5, 6, 9, 100, 102, 103 R, 707/104.1; 701/207, 208; 702/5; 340/990; 382/176, 180, 305
See application file for complete search history.

(56) References Cited

U.S. PATENT DOCUMENTS

| 5,710,877 A | * | 1/1998 | Marimont et al. | ........... 345/427 |
| 6,272,501 B1 | * | 8/2001 | Baumann | ................. 707/104.1 |
| 7,197,500 B1 | * | 3/2007 | Israni et al. | ................. 707/100 |

* cited by examiner

*Primary Examiner*—Phu Nguyen
(74) *Attorney, Agent, or Firm*—Patterson & Sheridan, LLP

(57) ABSTRACT

Embodiments of the invention provide an efficient and flexible organization of data for an acceleration data structure (e.g., spatial index). In contrast to storing primitive information within a spatial index, embodiments of the invention may store pointers in the spatial index which point to or link to primitive-defining information in buffers. Storing pointers to primitive-defining information may reduce the size of the spatial index. Additionally, embodiments of the invention enable vertex and triangle sharing. Vertex and triangle sharing may reduce the amount of storage space required to define the primitives within the three-dimensional scene. Furthermore, the data organization provided by the embodiments of the invention allows for easy manipulation of the spatial index and primitive data.

20 Claims, 22 Drawing Sheets

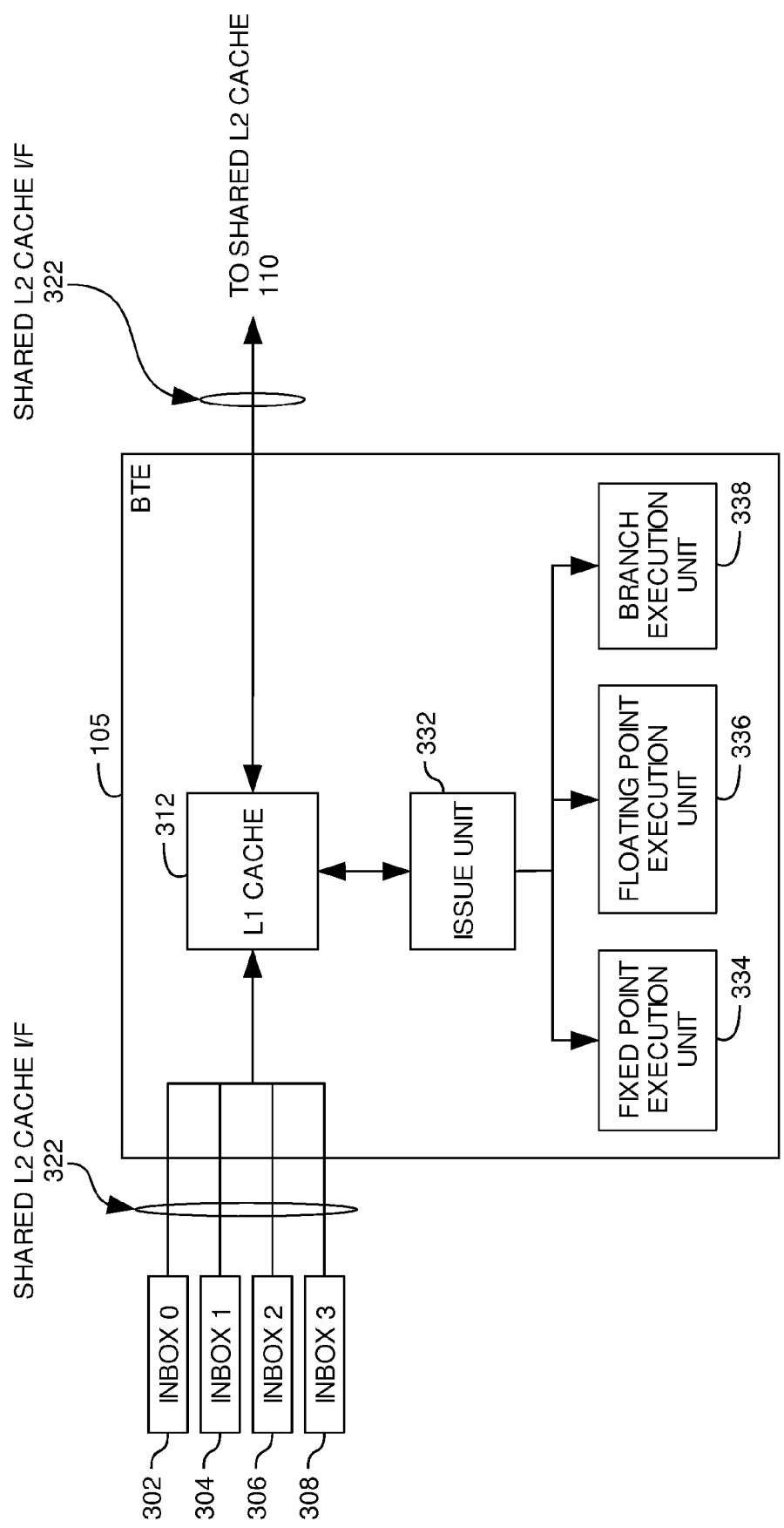

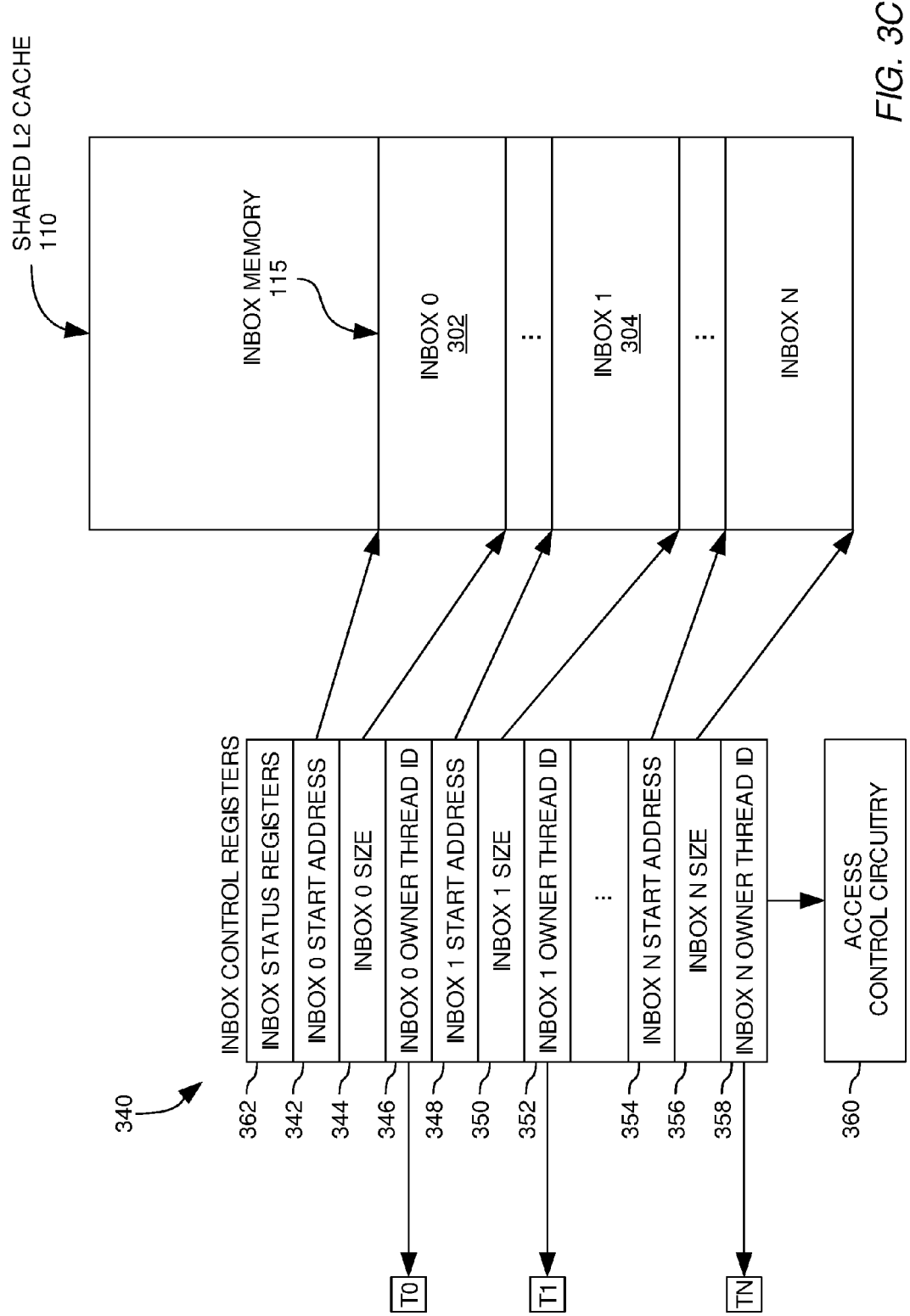

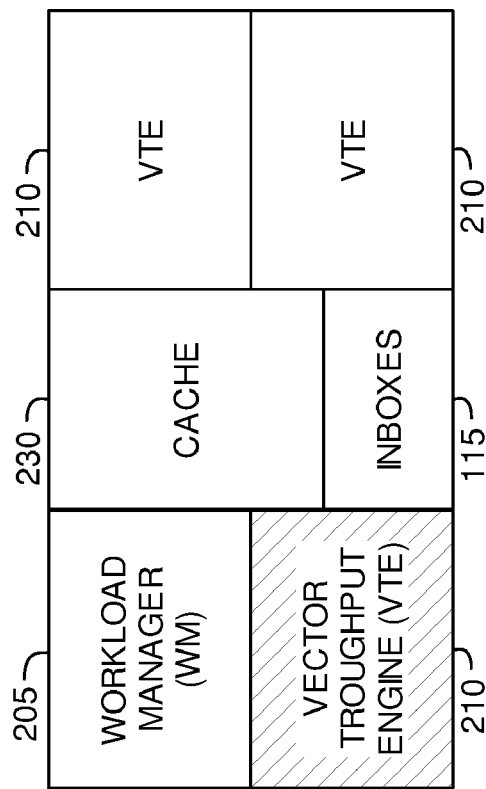
FIG. 8C
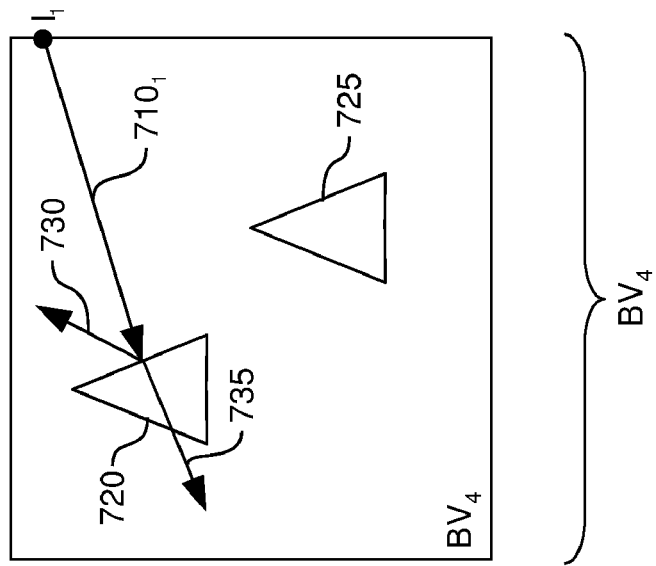

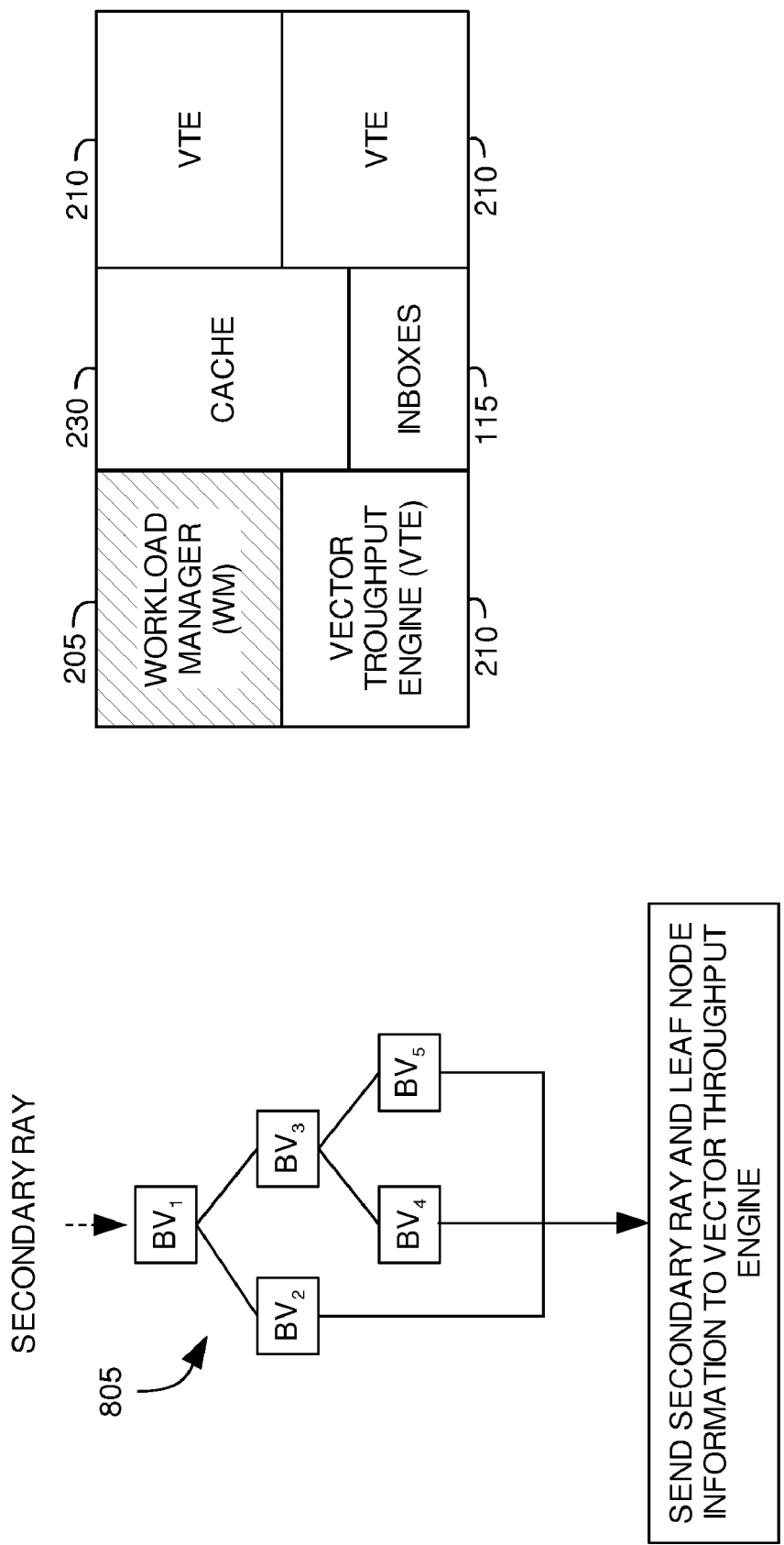

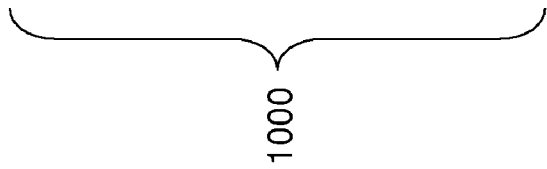
FIG. 10 - WORLD NODE

| BYTES | 0 | | | 1 | 2 | 3 | 4 | 5 | 6 | 7 |
|---|---|---|---|---|---|---|---|---|---|---|
| | 0 | 1:2 | 3:7 | | | | | | | |
| DESC. | NODE TYPE | SPLIT ORIENTATION | RSVD | LEFT CHILD OFFSET | | | SPLIT POSITION | | | |
| DETAIL | 0b0 - INTERIOR | 0b00 = X<br>0b01 = Y<br>0b10 = Z | | THE LEFT CHILD IS AT THIS OFFSET FROM THE TREE BUFFER BASE ADDRESS. EACH OFFSET INDEXES 8-BYTES | | | COORDINATE OF THE SPLIT PLANE IN THE GIVEN SPLIT ORIENTATION | | | |

{ 1100 }

*FIG. 11 - INTERIOR NODE*

| BYTES | 0 | | | 0 | | 1 | 2 | 3 | 4 | 5 | 6 | 7 |
|---|---|---|---|---|---|---|---|---|---|---|---|---|
| | 0 | 1:2 | 3:7 | | | | | | | | | |
| DESC. | NODE TYPE | RSVD | PROCESSING ELEMENT HINT | | | TRIANGLE COUNT | | | TRIANGLE LIST POINTER | | | |
| DETAIL | 0b1 - LEAF | | PROCESSING ELEMENT OR THREAD ID | | | THE NUMBER OF TRIANGLES IN THIS NODE'S TRIANGLE LIST | | | THIS IS A POINTER TO THE TRIANGLE LIST THAT RESIDES IN THE TRIANGLE LIST BUFFER | | | |

{ 1200

FIG. 12 - LEAF NODE

| BYTES (4B) | NAME | DETAIL |
|---|---|---|
| 0 | TRIANGLE 0 POINTER | POINTER TO A TRIANGLE IN THE TRIANGLE BUFFER |
| 4 | TRIANGLE 1 POINTER | POINTER TO A TRIANGLE IN THE TRIANGLE BUFFER |
| 8 | TRIANGLE 2 POINTER | POINTER TO A TRIANGLE IN THE TRIANGLE BUFFER |
| 4*(N-1) | TRIANGLE N-1 POINTER | POINTER TO A TRIANGLE IN THE TRIANGLE BUFFER |

*FIG. 13 – TRIANGLE LIST*

| BYTES (4B) | NAME | DETAIL |
|---|---|---|
| 0 | VERTEX 0 POINTER | POINTER TO A VERTEX IN THE VERTEX BUFFER |
| 4 | VERTEX 1 POINTER | POINTER TO A VERTEX IN THE VERTEX BUFFER |
| 8 | VERTEX 2 POINTER | POINTER TO A VERTEX IN THE VERTEX BUFFER |
| 12 | PROPERTIES POINTER | POINTER TO THE TRIANGLE PROPERTIES |

1400

FIG. 14 – TRIANGLE

| BYTES (4B) | NAME | DETAIL |
|---|---|---|
| 0 | VERTEX COORDINATE | COORDINATES OF THE VERTEX (X,Y,Z), 16-BYTE ALIGNED |
| 4 | | |
| 8 | | |
| 12 | RSVD | |

{ 1500

*FIG. 15 – VERTEX*

| BYTES | 0 | 1 | 2 | 3 |
|---|---|---|---|---|
| 0-3 | INTRINSIC COLOR (R,G, B,✓) | | | |
| 4-7 | TEXTURE OFFSET | | | |
| 8-11 | COEFFICIENT OF REFLECTION | | COEFFICIENT OF REFRACTION | |
| 12-15 | COEFFICIENT OF TRANSPARENCY | | RSVD | |
| 16-19 | COEFFICIENT OF DIFFUSE REFLECTION ($K_D$) | | | |
| 20-23 | COEFFICIENT OF SPECULAR REFLECTION ($K_S$) | | | |
| 24-27 | COEFFICIENT OF AMBIENT REFLECTION ($K_A$) | | | |
| 28-31 | PHONG EXPONENT (N) | | | |

1600

*FIG. 16 – TRIANGLE PROPERTIES*

EFFICIENT AND FLEXIBLE DATA ORGANIZATION FOR ACCELERATION DATA STRUCTURE NODES

BACKGROUND OF THE INVENTION

1. Field of the Invention

Embodiments of the invention generally relate to the field of image processing.

2. Description of the Related Art

The process of rendering two-dimensional images from three-dimensional scenes is commonly referred to as image processing. As the modern computer industry evolves image processing evolves as well. One particular goal in the evolution of image processing is to make two-dimensional simulations or renditions of three-dimensional scenes as realistic as possible. One limitation of rendering realistic images is that modern monitors display images through the use of pixels.

A pixel is the smallest area of space which can be illuminated on a monitor. Most modern computer monitors will use a combination of hundreds of thousands or millions of pixels to compose the entire display or rendered scene. The individual pixels are arranged in a grid pattern and collectively cover the entire viewing area of the monitor. Each individual pixel may be illuminated to render a final picture for viewing.

One technique for rendering a real world three-dimensional scene onto a two-dimensional monitor using pixels is called rasterization. Rasterization is the process of taking a two-dimensional image represented in vector format (mathematical representations of geometric objects within a scene) and converting the image into individual pixels for display on the monitor. Rasterization is effective at rendering graphics quickly and using relatively low amounts of computational power; however, rasterization suffers from some drawbacks. For example, rasterization often suffers from a lack of realism because it is not based on the physical properties of light, rather rasterization is based on the shape of three-dimensional geometric objects in a scene projected onto a two-dimensional plane. Furthermore, the computational power required to render a scene with rasterization scales directly with an increase in the complexity of the scene to be rendered. As image processing becomes more realistic, rendered scenes also become more complex. Therefore, rasterization suffers as image processing evolves, because rasterization scales directly with complexity.

Another technique for rendering a real world three-dimensional scene onto a two-dimensional monitor using pixels is called ray tracing. The ray tracing technique traces the propagation of imaginary rays, rays which behave similar to rays of light, into a three-dimensional scene which is to be rendered onto a computer screen. The rays originate from the eye(s) of a viewer sitting behind the computer screen and traverse through pixels, which make up the computer screen, towards the three-dimensional scene. Each traced ray proceeds into the scene and may intersect with objects within the scene. If a ray intersects an object within the scene, properties of the object and several other contributing factors are used to calculate the amount of color and light, or lack thereof, the ray is exposed to. These calculations are then used to determine the final color of the pixel through which the traced ray passed.

The process of tracing rays is carried out many times for a single scene. For example, a single ray may be traced for each pixel in the display. Once a sufficient number of rays have been traced to determine the color of all of the pixels which make up the two-dimensional display of the computer screen, the two-dimensional synthesis of the three-dimensional scene can be displayed on the computer screen to the viewer.

Ray tracing typically renders real world three-dimensional scenes with more realism than rasterization. This is partially due to the fact that ray tracing simulates how light travels and behaves in a real world environment, rather than simply projecting a three-dimensional shape onto a two-dimensional plane as is done with rasterization. Therefore, graphics rendered using ray tracing more accurately depict on a monitor what our eyes are accustomed to seeing in the real world.

Furthermore, ray tracing also handles increases in scene complexity better than rasterization as scenes become more complex. Ray tracing scales logarithmically with scene complexity. This is due to the fact that the same number of rays may be cast into a scene, even if the scene becomes more complex. Therefore, ray tracing does not suffer in terms of computational power requirements as scenes become more complex as rasterization does.

One major drawback of ray tracing is the large number of calculations, and thus processing power, required to render scenes. This leads to problems when fast rendering is needed. For example, when an image processing system is to render graphics for animation purposes such as in a game console. Due to the increased computational requirements for ray tracing it is difficult to render animation quickly enough to seem realistic (realistic animation is approximately twenty to twenty-four frames per second).

Therefore, there exists a need for more efficient techniques and devices to perform ray tracing.

SUMMARY OF THE INVENTION

Embodiments of the present invention generally provide methods and apparatus for performing ray tracing.

According to one embodiment of the invention a method for generating a two-dimensional image of a three-dimensional scene containing at least one dynamic object is provided. The method generally comprising: generating a spatial index having a world root node, internal nodes corresponding to bounding volumes with partitioned sub-volumes of the scene, and leaf nodes corresponding to unpartitioned sub-volumes of the scene containing primitive objects; generating a leaf node link from at least one of the leaf nodes to a list of pointers to data objects corresponding to one or more primitive objects that represent the dynamic object; and in response to a change in at least one of shape and location of the dynamic object, updating one or more of the data objects to reflect the change without updating the leaf node link.

Another embodiment of the invention provides a method for generating and traversing a spatial index. The method generally comprising: generating a spatial index having a world root node representing a volume which encompasses a three-dimensional scene, internal nodes corresponding to bounding volumes with partitioned sub-volumes, and leaf nodes corresponding to unpartitioned sub-volumes containing primitive objects; generating links from internal nodes to nodes corresponding to sub-volumes created by partitioning planes which partition the internal nodes; generating a leaf node link from at least one of the leaf nodes to a list of pointers to data objects corresponding to one or more primitive objects contained within the sub-volume corresponding to the leaf node; issuing a ray into the three-dimensional scene; traversing the ray through the spatial index to a leaf node; and generating a pixel value based on primitive object information retrieved using the leaf node link.

Another embodiment of the invention provides an image processing system. The image processing system generally comprising: a physics engine to move one or more dynamic objects in an animated scene; and logic configured to generate a spatial index having a world root node, internal nodes corresponding to bounding volumes with partitioned sub-volumes, and leaf nodes corresponding to unpartitioned sub-volumes containing primitive objects; generate a leaf node link from at least one of the leaf nodes to a list of pointers to data objects corresponding to one or more primitive objects that represent the dynamic object; and in response to a change in at least one of shape and location of the one or more dynamic objects, update one or more of the data objects without updating the leaf node link.

BRIEF DESCRIPTION OF THE DRAWINGS

FIGS. 3A-3C are block diagrams illustrating aspects of memory inboxes according to one embodiments of the invention.

FIGS. 8A-8D illustrate an exemplary method of performing ray tracing, according to one embodiment of the invention.

FIG. 10 illustrates an exemplary world node data structure, according to embodiments of the invention.

FIG. 11 illustrates an exemplary interior node data structure, according to embodiments of the invention.

FIG. 12 illustrates an exemplary leaf node data structure, according to embodiments of the invention.

FIG. 13 illustrates an exemplary triangle pointer list, according to embodiments of the invention.

FIG. 14 illustrates an exemplary triangle data structure, according to embodiments of the invention.

FIG. 15 illustrates an exemplary vertex data structure, according to embodiments of the invention.

FIG. 16 illustrates an exemplary triangle properties data structure, according to embodiments of the invention.

DETAILED DESCRIPTION OF THE PREFERRED EMBODIMENTS

Figure 1:
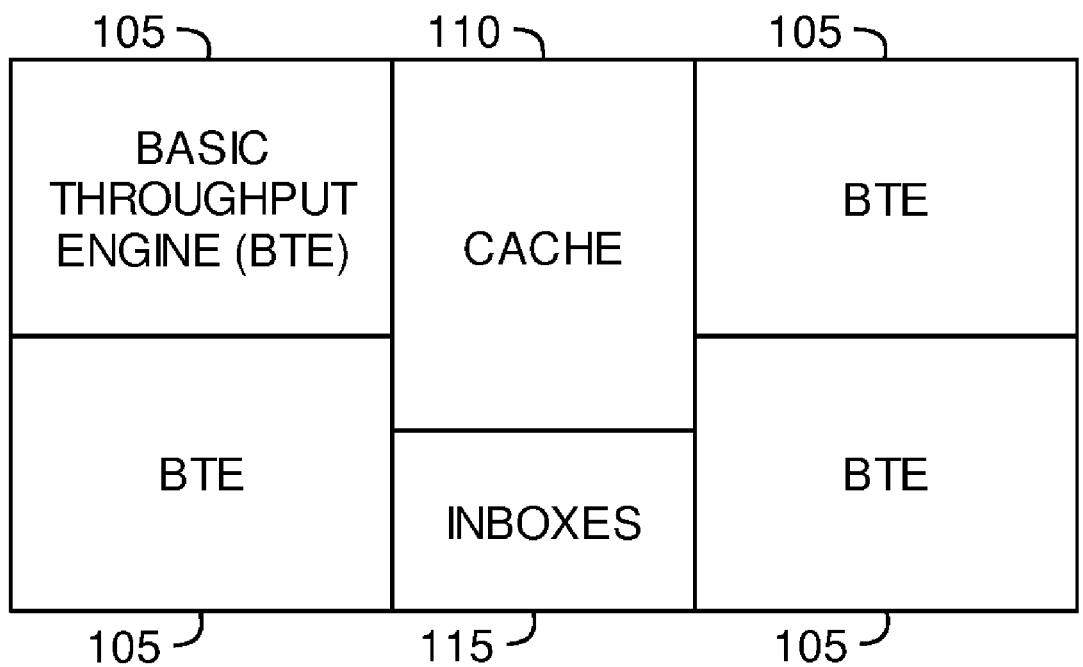
FIG. 1 is a block diagram depicting an exemplary computer processor, according to one embodiment of the invention.

The present invention provides methods and apparatus for forming a data organization to facilitate ray tracing image processing. According to embodiments of the invention, the data organization may include a spatial index containing pointers to primitive-defining information located within buffers. By storing pointers in the spatial index which point to primitive-defining information in buffers rather than storing the primitive information within the spatial index, embodiments of the invention may reduce the size of the spatial index. Additionally, embodiments of the invention enable vertex and triangle sharing. Vertex and triangle sharing may reduce the amount of storage space required to define the primitives within the three-dimensional scene by eliminating duplication of information within the data organization. Furthermore, the data organization provided by the embodiments of the invention allows for easy and rapid manipulation of spatial index and primitive data.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system such as, for example, the image processing system described below. The program(s) of the program product defines functions of the embodiments (including the methods described herein) and can be contained on a variety of computer-readable media. Illustrative computer-readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such computer-readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

An Exemplary Multiple Core Processing Element

FIG. 1 illustrates a multiple core processing element 100, according to one embodiment of the invention. The multiple core processing element 100 includes a plurality of basic throughput engines 105 (BTEs). A BTE 105 may contain a plurality of processing threads and a core cache (e.g., an L1 cache). The processing threads located within each BTE may have access to a shared multiple core processing element memory cache 110 (e.g., a shared L2 cache).

The BTEs 105 may also have access to a plurality of inboxes 115. The inboxes 115, described further below with regards to FIG. 3, may be memory mapped address space. The inboxes 115 may be mapped to the processing threads located within each of the BTEs 105. Each thread located within the BTEs may have a memory mapped inbox and access to all of the other memory mapped inboxes 115. The inboxes 115 make up a low-latency and high-bandwidth communications network used by the BTEs 105.

The BTEs may use the inboxes 115 as a network to communicate with each other and redistribute data processing work amongst the BTEs. For some embodiments, separate outboxes may be used in the communications network, for example, to receive the results of processing by BTEs 105. For other embodiments, inboxes 115 may also serve as outboxes, for example, with one BTE 105 writing the results of a processing function directly to the inbox of another BTE 105 that will use the results.

The aggregate performance of an image processing system may be tied to how well the BTEs can partition and redistribute work. The network of inboxes 115 may be used to collect and distribute work to other BTEs without corrupting the shared multiple core processing element cache 110 with BTE communication data packets that have no frame to frame coherency. An image processing system which can render many millions of triangles per frame may include many BTEs 105 connected in this manner.

In one embodiment of the invention, the threads of one BTE 105 may be assigned to a workload manager. An image processing system may use various software and hardware components to render a two-dimensional image from a three-dimensional scene. As described further below with regards to FIG. 6, according to one embodiment of the invention, an image processing system may use a workload manager to traverse a spatial index with a ray issued by the image processing system. A spatial index, as described further below with regards to FIG. 4, may be implemented as a tree type data structure used to partition a relatively large three-dimensional scene into smaller bounding volumes. An image processing system using a ray tracing methodology for image processing may use a spatial index to quickly determine ray-bounding volume intersections. In one embodiment of the invention, the workload manager may perform ray-bounding volume intersection tests by using the spatial index.

In one embodiment of the invention, other threads of the multiple core processing element BTEs 105 on the multiple core processing element 100 may be vector throughput engines. After a workload manager determines a ray-bounding volume intersection, the workload manager may issue (send), via the inboxes 115, the ray to one of a plurality of vector throughput engines. According to one embodiment of the invention, and described further below with regards to FIG. 6, the vector throughput engines may then determine if the ray intersects a primitive contained within the bounding volume. The vector throughput engines may also perform operations relating to determining the color of the pixel through which the ray passed.

Figure 2:
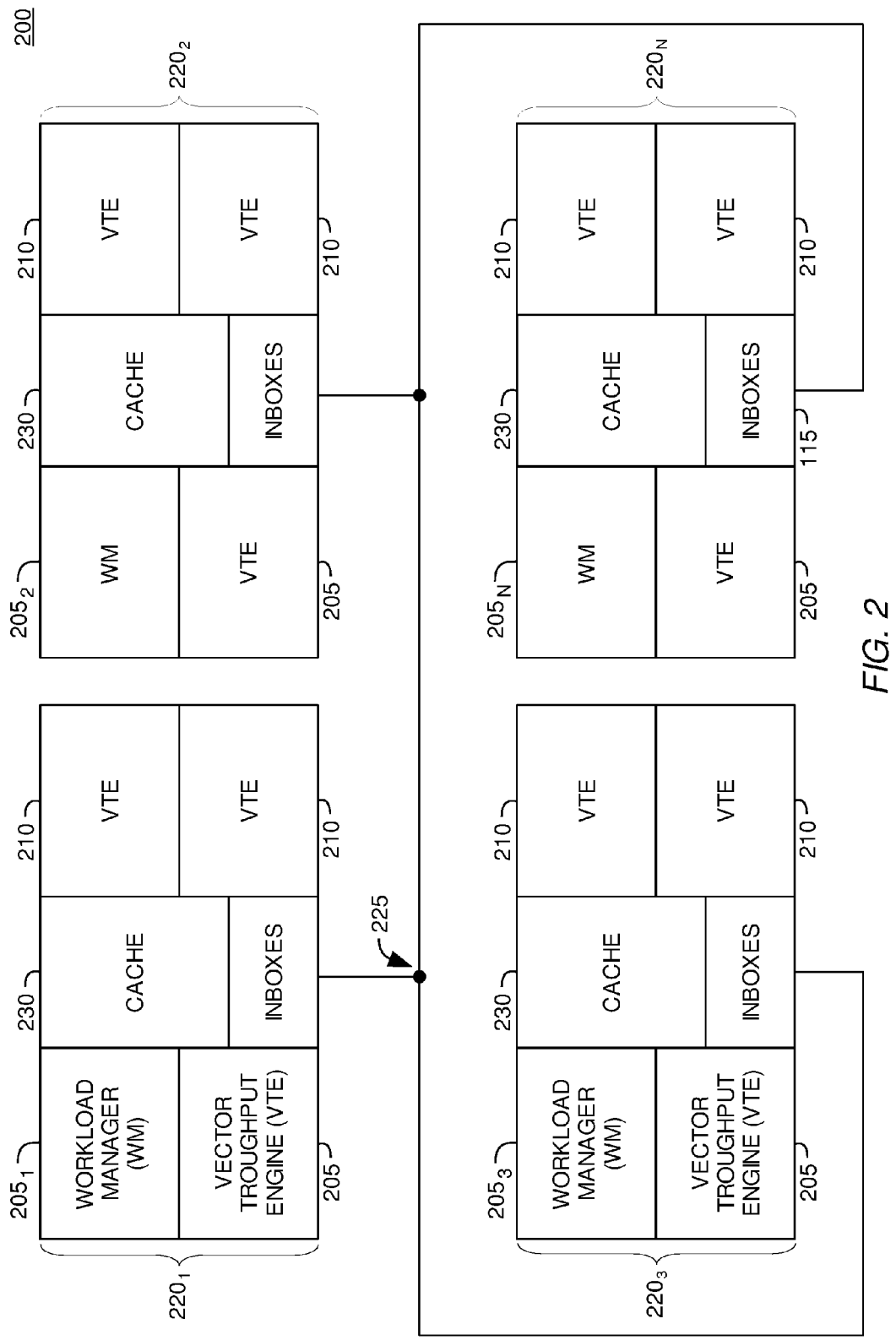
FIG. 2 illustrates a multiple-core processing element network, according to one embodiment of the invention.

FIG. 2 illustrates a network of multiple core processing elements 200, according to one embodiment of the invention. FIG. 2 also illustrates one embodiment of the invention where the threads of one of the BTEs of the multiple core processing element 100 is a workload manager 205. Each multiple core processing element $220_{1-N}$ in the network of multiple core processing elements 200 may contain one workload manager $205_{1-N}$, according to one embodiment of the invention. Each processor 220 in the network of multiple core processing elements 200 may also contain a plurality of vector throughput engines 210, according to one embodiment of the invention.

The workload managers $220_{1-N}$ may use a high speed bus 225 to communicate with other workload managers $220_{1-N}$ and/or vector throughput engines 210 of other multiple core processing elements 220, according to one embodiment of the invention. Each of the vector throughput engines 210 may use the high speed bus 225 to communicate with other vector throughput engines 210 or the workload managers 205. The workload manager processors 205 may use the high speed bus 225 to collect and distribute image processing related tasks to other workload manager processors 205, and/or distribute tasks to other vector throughput engines 210. The use of a high speed bus 225 may allow the workload managers $205_{1-N}$ to communicate without affecting the caches 230 with data packets related to workload manager 205 communications.

Low-Latency High-Bandwidth Communications Network

As described above, the aggregate performance of an image processing system may be tied to how well the BTEs can partition and redistribute work. According to one embodiment of the invention, memory space within a cache, referred to as a memory inbox, may be used to distribute work to a single processor thread. In an image processing system using a plurality of processors each having a plurality of threads, the collection of inboxes together may be referred to as a low-latency high-bandwidth communications network.

In multithreading processor such as a BTE 105, a memory inbox may be assigned to a given thread (referred to herein as the owner thread). In one embodiment of the invention, the memory space for the inbox may be allocated from the shared memory cache 110 exclusively to the owner thread. By exclusively assigning the memory space in a cache to the owner thread, the owner thread may maintain enough memory space to cache its own instructions and data without other having other competing threads displace the owner thread's instructions and data. Thus, the memory inbox may improve execution of the owner thread by maintaining the owner thread's data and instructions in the assigned inbox portion of the cache and reducing the possibility of stalling the owner thread while data and instructions for the owner thread are retrieved from higher levels of memory. Furthermore, by assigning the memory space in a cache to the owner thread, data or instructions intended for the targeted thread may be stored only in an inbox allocated to the thread. Thus, data or instructions intended for the targeted thread are not stored throughout the shared memory cache 110, rather only in the inbox allocated to the targeted thread.

Furthermore, the inbox memory may be used by other threads to efficiently communicate with the owner thread. For example, where another thread has data and/or instructions which are to be provided to the owner thread for an inbox, the other thread may send the data and/or instructions to the inbox where the data and/or instructions may be retrieved by the owner thread. Similarly, in some cases, the owner thread may use the inbox as an outbox to communicate information with other threads. For example, to communicate the information with another thread, the owner thread may place the information in the inbox and send a notification to the other thread indicating the location of the data and/or instructions, thereby allowing the other thread to retrieve the information. Optionally, the owner thread may provide the information directly to the inbox of the other thread. Thus, the inbox memory may be used to simplify communication between a sending and a receiving thread while preventing displacement of data and/or instructions being used by other threads.

Figure 3A:
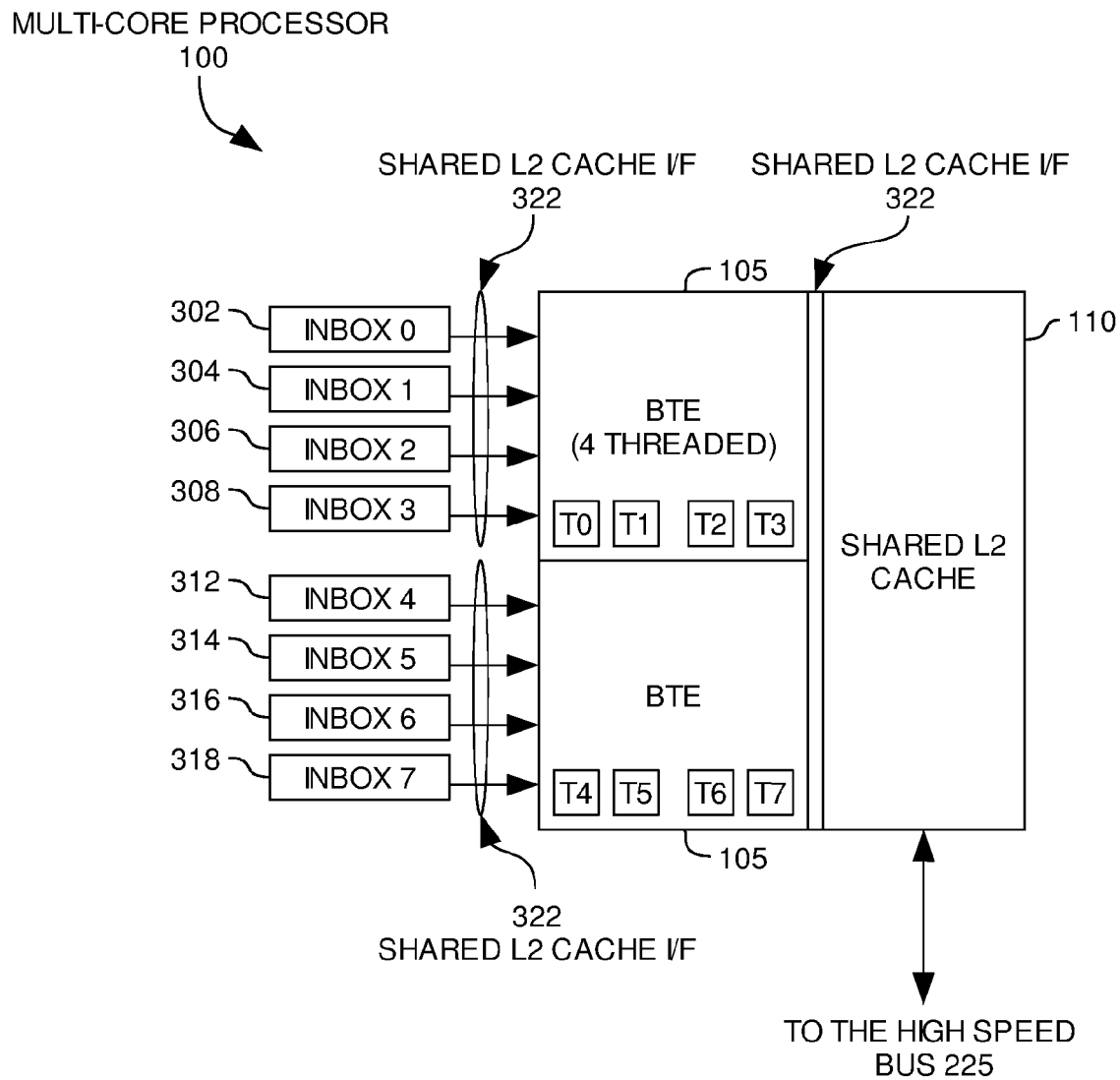

FIG. 3A is a block diagram of memory inboxes 302 . . . 318 in a multi-core processor element 100 according to one embodiment of the invention. The depiction of the memory inboxes 302 . . . 318 is intended to be a conceptual view and therefore is not limited to any particular physical configuration. As depicted, threads (e.g., threads T0-T7) executing in each core (e.g., the BTEs 105) may have access to the shared L2 cache 110 via a shared L2 cache interface 322. Furthermore, the L2 cache interface 322 may also be used by the threads T0 . . . T7 to access the corresponding memory inboxes 302 . . . 318. As described above, in some cases, each inbox 302 . . . 318 may be assigned to a corresponding thread T0-T7. Thus, Inbox 0 302 may be assigned to thread T0 and so on. As described below, by assigning a given inbox to a given thread, access to the assigned inbox may be unrestricted with respect to the owner thread while access by other threads may be restricted. Exemplary restrictions are described below in greater detail.

FIG. 3B is a block diagram depicting the path of data from memory inboxes (e.g., inboxes 302 . . . 308) and the shared L2 cache 110 transmitted to and from a processing core (e.g., BTE 105). As described above, both the memory inboxes 302 . . . 308 and the shared L2 cache 110 may be accessed via the shared L2 cache interface 322. Where a thread being executed in the BTE 105 retrieves data from an inbox 302 . . . 308 or from the shared L2 cache 110, the retrieved data may be placed in the L1 cache 312 for the BTE 105. Instructions for the thread may be issued from an issue unit 332. In some cases, the BTE 105 may be configured to execute multiple threads concurrently. Thus, the issue unit 332 may be configured to issue instructions for multiple threads. In some cases, the BTE 105 may provide multiple execution units 334 . . . 338 which may be used to concurrently execute threads in the BTE 105. The execution units 334 . . . 338 may include a fixed point execution unit 334, a floating point execution unit 336, and a branch execution unit 338.

In some cases, a thread may update or produce data which is to be accessed later (e.g., by the same thread or by another thread). Where the updated data is to be accessed later, the thread may place the updated data in an L1 cache 312. Furthermore, where desired, the updated data may also be placed in the L2 cache 110 or in an inbox 302 . . . 308 for the updating thread via the shared L2 cache interface 322. In some cases, as described above, direct access to a given inbox (e.g., inbox 0 302) via the shared L2 cache interface 322 may be limited to the thread (e.g., thread T0) which owns the given inbox.

In one embodiment of the invention, memory space within a memory inbox may be mapped to a global memory address (e.g., all levels of memory including the L1 cache 312, L2 cache 110, and main memory as well as all threads may use the same global memory address to access a given memory inbox). Thus, in one embodiment of the invention, to access the inbox memory space, the owner thread may merely read or write the desired information to a global memory address corresponding to the inbox memory space. A thread which does not own the memory inbox and which attempts to directly access the inbox via the global memory address, may have access to the inbox denied. Other forms of access may instead be provided to other non-owning threads, e.g., via packetized messages sent to the inbox.

Also, in one embodiment of the invention, information being stored in a memory inbox may not be cacheable. For example, while information in the L1 cache 312, L2 cache 110, and other memory level may be automatically cached by the multi core processing element 100 such that information requested from a given memory address may be automatically fetched from main memory and maintained in one of the cache levels 312, 110 while being accessed. In contrast, the globally addressable memory in a given inbox may only be located in the inbox and may not be moved between different levels of the memory hierarchy (e.g., the main memory, the shared L2 cache memory 110 or the L1 cache memory) without being copied to a new address space outside of the inbox. Thus, accesses to an inbox by an owner thread may be performed quickly and directly to the inbox memory without waiting for information to be fetched from another level of the memory hierarchy and/or translated during fetching. The non-cacheability of inbox memory may also apply with respect to packetized access of the inbox described below. Furthermore, in an alternate embodiment of the invention, information stored in the inbox may be cached in other levels of the memory hierarchy.

Assignment of Memory Inboxes

In one embodiment of the invention, memory inboxes may be provided from the shared memory cache 110 (e.g., a portion of the L2 cache 110 may be reserved for the inbox memory 115). FIG. 3C is a block diagram depicting inbox memory 115 partitioned from the shared L2 cache 110 according to one embodiment of the invention.

As depicted, the size and location of each inbox 302, 304, etc. may be controlled by inbox control registers 340. The status of each inbox 302, 304, etc. (e.g., enabled or disabled) may be indicated and/or modified via inbox status registers 362. In one embodiment, access to the inbox control registers 340 may be unrestricted. Optionally, in some cases, access to the inbox control registers may be limited, for example, to a subset of approved threads (e.g., the owner thread, a parent of the owner thread, a specially designated control thread, and/or an operating system kernel thread). In one embodiment, the inbox control registers 340 may include a start address register 342, 348 . . . 354, a size register 344, 350 . . . 356, and an owner thread identification register 346, 352 . . . 358.

In one embodiment, the start address registers 342, 348 . . . 354 may indicate a start address for each inbox 302, 304, etc. The size registers 344, 350 . . . 358 may indicate the size of a corresponding inbox 302, 304, etc. The memory space for an inbox may thus occupy each address beginning from the corresponding start address and ranging through the indicated size of the inbox. The size may be indicated in any manner, for example, as an absolute size in bytes or as an integer multiple of a fixed size (e.g., the size in the size registers 344, 350 . . . 358 may indicate the size in kilobytes).

In one embodiment, the owner thread identification register 346, 352 . . . 358 may identify which thread (e.g., thread T0, T1 . . . TN) owns a given inbox 302, 304, etc. While depicted with respect to threads and corresponding inboxes 1, 2 . . . N, embodiment of the invention may be used with any type of thread and/or inbox identifier (e.g., a number, an address, etc.). In one embodiment of the invention, the inbox identifier register may be used to restrict direct access to memory addresses within the corresponding inbox to the owner thread. In some cases, direct access may also be allowed by a limited selection of other threads, such as, for example, a parent thread of the owner thread, a specified control thread, and/or an operating system kernel thread. In one embodiment, access control circuitry 360 may be used to provide the restricted access.

By assigning portions of the shared memory cache 110 to the inboxes a low-latency high-bandwidth communications network may be formed. The remaining portion of the shared memory cache 110 may remain unassigned and, thus, available to store information which does not relate to communications between processing threads. The remaining portion of the shared memory cache 110 may be used to store geometry and data structures which are used by the image processing system to perform ray tracing (described further below with respect to FIG. 5).

A benefit of using only the inboxes for communications between processing threads and using the remaining portion of the shared memory cache 110 to store geometry and data structures is that no matter how much communications related information is passed through the inboxes, it will not consume the entire memory cache. Thus, as will be described further below, communications related information will not displace the geometry and data structures stored within the remaining portion of the shared memory cache 100. Therefore, data which is likely to be reused when tracing subsequent rays or rendering subsequent frames (object geometry and data structures) may remain in the cache, while data which is unlikely to be reused when tracing subsequent rays or rendering subsequent frames (data processing work) will not remain in the cache.

An Exemplary Three-Dimensional Scene

Figure 4:
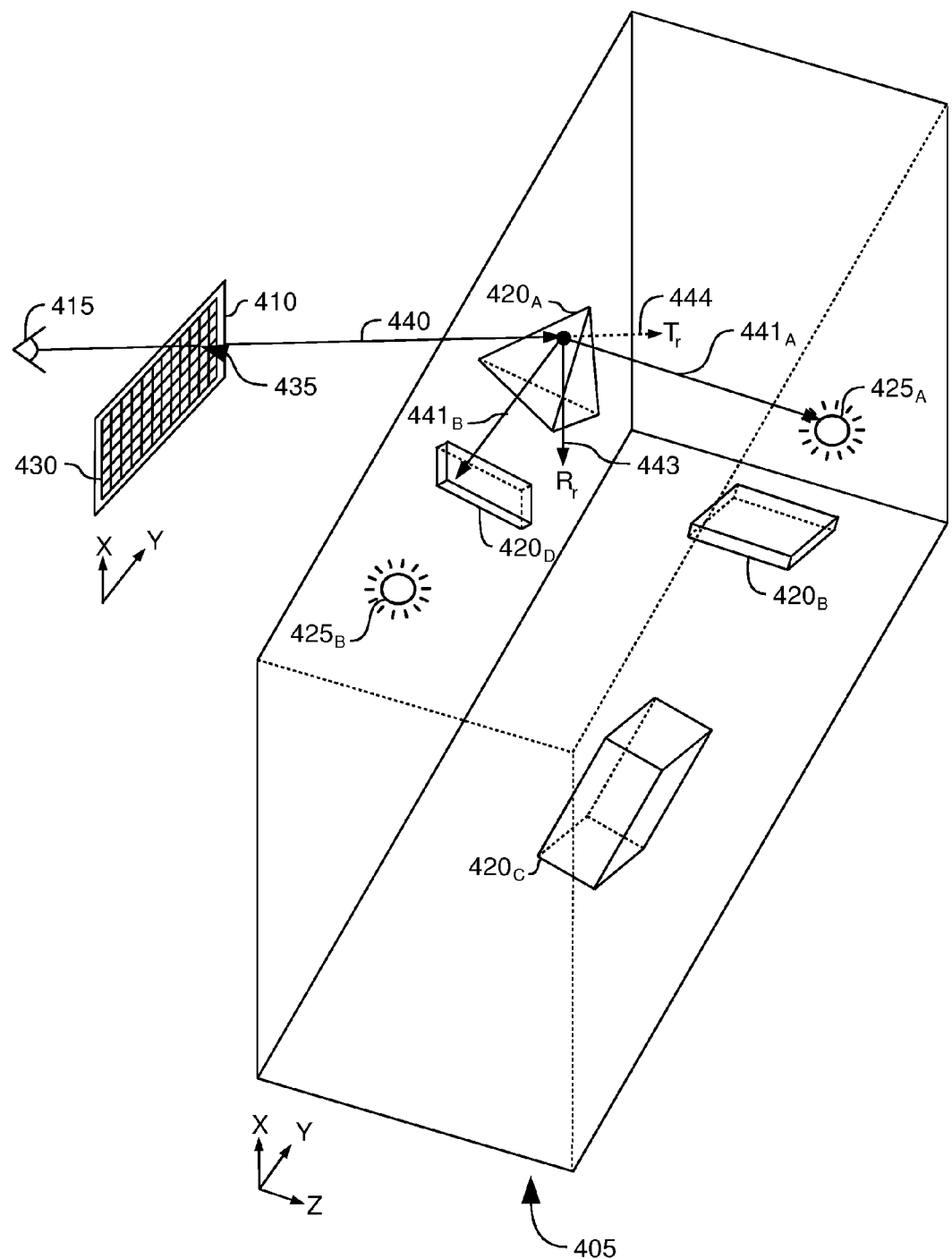
FIG. 4 is an exemplary three-dimensional scene to be rendered by an image processing system, according to one embodiment of the invention.

FIG. 4 is an exemplary three-dimensional scene 405 to be rendered by an image processing system. Within the three-dimensional scene 405 may be objects 420. The objects 420 in FIG. 4 are of different geometric shapes. Although only four objects 420 are illustrated in FIG. 4, the number of objects in a typical three-dimensional scene may be more or less. Commonly, three-dimensional scenes will have many more objects than illustrated in FIG. 4.

As can be seen in FIG. 4 the objects are of varying geometric shape and size. For example, one object in FIG. 4 is a pyramid 420$_A$. Other objects in FIG. 4 are boxes 420$_{B-D}$. In many modern image processing systems objects are often broken up into smaller geometric shapes (e.g., squares, circles, triangles, etc.). The larger objects are then represented by a number of the smaller simple geometric shapes. These smaller geometric shapes are often referred to as primitives.

Also illustrated in the scene 405 are light sources 425$_{A-B}$. The light sources may illuminate the objects 420 located within the scene 405. Furthermore, depending on the location of the light sources 425 and the objects 420 within the scene 405, the light sources may cause shadows to be cast onto objects within the scene 405.

The three-dimensional scene 405 may be rendered into a two-dimensional picture by an image processing system. The image processing system may also cause the two-dimensional picture to be displayed on a monitor 410. The monitor 410 may use many pixels 430 of different colors to render the final two-dimensional picture.

One method used by image processing systems to rendering a three-dimensional scene 420 into a two-dimensional picture is called ray tracing. Ray tracing is accomplished by the image processing system "issuing" or "shooting" rays from the perspective of a viewer 415 into the three-dimensional scene 420. The rays have properties and behavior similar to light rays.

One ray 440, that originates at the position of the viewer 415 and traverses through the three-dimensional scene 405, can be seen in FIG. 4. As the ray 440 traverses from the viewer 415 to the three-dimensional scene 405, the ray 440 passes through a plane where the final two-dimensional picture will be rendered by the image processing system. In FIG. 4 this plane is represented by the monitor 410. The point the ray 440 passes through the plane, or monitor 410, is represented by a pixel 435.

As briefly discussed earlier, most image processing systems use a grid 430 of thousands (if not millions) of pixels to render the final scene on the monitor 410. Each individual pixel may display a different color to render the final composite two-dimensional picture on the monitor 410. An image processing system using a ray tracing image processing methodology to render a two-dimensional picture from a three-dimensional scene will calculate the colors that the issued ray or rays encounters in the three-dimensional scene. The image processing scene will then assign the colors encountered by the ray to the pixel through which the ray passed on its way from the viewer to the three-dimensional scene.

The number of rays issued per pixel may vary. Some pixels may have many rays issued for a particular scene to be rendered. In which case the final color of the pixel is determined by the each color contribution from all of the rays that were issued for the pixel. Other pixels may only have a single ray issued to determine the resulting color of the pixel in the two-dimensional picture. Some pixels may not have any rays issued by the image processing system, in which case their color may be determined, approximated or assigned by algorithms within the image processing system.

To determine the final color of the pixel 435 in the two-dimensional picture, the image processing system must determine if the ray 440 intersects an object within the scene. If the ray does not intersect an object within the scene it may be assigned a default background color (e.g., blue or black, representing the day or night sky). Conversely, as the ray 440 traverses through the three-dimensional scene the ray 440 may strike objects. As the rays strike objects within the scene the color of the object may be assigned the pixel through which the ray passes. However, the color of the object must be determined before it is assigned to the pixel.

Many factors may contribute to the color of the object struck by the original ray 440. For example, light sources within the three-dimensional scene may illuminate the object. Furthermore, physical properties of the object may contribute to the color of the object. For example, if the object is reflective or transparent, other non-light source objects may then contribute to the color of the object.

In order to determine the effects from other objects within the three-dimensional scene, secondary rays may be issued from the point where the original ray 440 intersected the object. For example, one type of secondary ray may be a shadow ray. A shadow ray may be used to determine the contribution of light to the point where the original ray 440 intersected the object. Another type of secondary ray may be a transmitted ray. A transmitted ray may be used to determine what color or light may be transmitted through the body of the object. Furthermore, a third type of secondary ray may be a reflected ray. A reflected ray may be used to determine what color or light is reflected onto the object.

As noted above, one type of secondary ray may be a shadow ray. Each shadow ray may be traced from the point of intersection of the original ray and the object, to a light source within the three-dimensional scene 405. If the ray reaches the light source without encountering another object before the ray reaches the light source, then the light source will illuminate the object struck by the original ray at the point where the original ray struck the object.

For example, shadow ray 441$_A$ may be issued from the point where original ray 440 intersected the object 420$_A$, and may traverse in a direction towards the light source 425$_A$. The shadow ray 441$_A$ reaches the light source 425$_A$ without encountering any other objects 420 within the scene 405. Therefore, the light source 425$_A$ will illuminate the object 420$_A$ at the point where the original ray 440 intersected the object 420$_A$.

Other shadow rays may have their path between the point where the original ray struck the object and the light source blocked by another object within the three-dimensional scene. If the object obstructing the path between the point on the object the original ray struck and the light source is opaque, then the light source will not illuminate the object at the point where the original ray struck the object. Thus, the light source may not contribute to the color of the original ray and consequently neither to the color of the pixel to be rendered in the two-dimensional picture. However, if the object is translucent or transparent, then the light source may illuminate the object at the point where the original ray struck the object.

For example, shadow ray 441$_B$ may be issued from the point where the original ray 440 intersected with the object 420$_A$, and may traverse in a direction towards the light source 425$_B$. In this example, the path of the shadow ray 441$_B$ is blocked by an object 420$_D$. If the object 420$_D$ is opaque, then the light source 425$_B$ will not illuminate the object 420$_A$ at the point where the original ray 440 intersected the object 420$_A$. However, if the object 420$_D$ which the shadow ray is translucent or transparent the light source 425$_B$ may illuminate the object 420$_A$ at the point where the original ray 440 intersected the object 420$_A$.

Another type of secondary ray is a transmitted ray. A transmitted ray may be issued by the image processing system if the object with which the original ray intersected has transparent or translucent properties (e.g., glass). A transmitted ray traverses through the object at an angle relative to the angle at which the original ray struck the object. For example, transmitted ray 444 is seen traversing through the object 420$_A$ which the original ray 440 intersected.

Another type of secondary ray is a reflected ray. If the object with which the original ray intersected has reflective properties (e.g. a metal finish), then a reflected ray will be issued by the image processing system to determine what color or light may be reflected by the object. Reflected rays traverse away from the object at an angle relative to the angle at which the original ray intersected the object. For example, reflected ray 443 may be issued by the image processing system to determine what color or light may be reflected by the object 420$_A$ which the original ray 440 intersected.

The total contribution of color and light of all secondary rays (e.g., shadow rays, transmitted rays, reflected rays, etc.) will result in the final color of the pixel through which the original ray passed.

An Exemplary KD-Tree

One problem encountered when performing ray tracing is determining quickly and efficiently if an issued ray intersects any objects within the scene to be rendered. One methodology known by those of ordinary skill in the art to make the ray intersection determination more efficient is to use a spatial index. A spatial index divides a three-dimensional scene or world into smaller volumes (smaller relative to the entire three-dimensional scene) which may or may not contain primitives. An image processing system can then use the known boundaries of these smaller volumes to determine if a ray may intersect primitives contained within the smaller volumes. If a ray does intersect a volume containing primitives, then a ray intersection test can be run using the trajectory of the ray against the known location and dimensions of the primitives contained within that volume. If a ray does not intersect a particular volume then there is no need to run ray-primitive intersection tests against the primitives contained within that volume. Furthermore, if a ray intersects a bounding volume which does not contain primitives then there is no need to run ray-primitive intersections tests against that bounding volume. Thus, by reducing the number of ray-primitive intersection tests which may be necessary, the use of a spatial index greatly increases the performance of a ray tracing image processing system. Some examples of different spatial index acceleration data structures are octrees, k dimensional Trees (kd-Trees), and binary space partitioning trees (BSP trees). While several different spatial index structures exist, for ease of describing embodiments of the present invention, a kd-Tree will be used in the examples to follow. However, those skilled in the art will readily recognize that embodiments of the invention may be applied to any of the different types of spatial indexes.

A kd-Tree uses axis aligned bounding volumes to partition the entire scene or space into smaller volumes. That is, the kd-Tree may divide a three-dimensional space encompassed by a scene through the use of splitting planes which are parallel to known axes. The splitting planes partition a larger space into smaller bounding volumes. Together the smaller bounding volumes make up the entire space in the scene. The determination to partition (divide) a larger bounding volume into two smaller bounding volumes may be made by the image processing system through the use of a kd-tree construction algorithm.

One criterion for determining when to partition a bounding volume into smaller volumes may be the number of primitives contained within the bounding volume. That is, as long as a bounding volume contains more primitives than a predetermined threshold, the tree construction algorithm may continue to divide volumes by drawing more splitting planes. Another criterion for determining when to partition a bounding volume into smaller volumes may be the amount of space contained within the bounding volume. Furthermore, a decision to continue partitioning the bounding volume may also be based on how many primitives may be intersected by the plane which creates the bounding volume.

The partitioning of the scene may be represented by a binary tree structure made up of nodes, branches and leaves. Each internal node within the tree may represent a relatively large bounding volume, while the node may contain branches to sub-nodes which may represent two relatively smaller partitioned volumes resulting after a partitioning of the relatively large bounding volume by a splitting plane. In an axis-aligned kd-Tree, each internal node may contain only two branches to other nodes. The internal node may contain branches (i.e., pointers) to one or two leaf nodes. A leaf node is a node which is not further sub-divided into smaller volumes and contains pointers to primitives. An internal node may also contain branches to other internal nodes which are further sub-divided. An internal node may also contain the information needed to determine along what axis the splitting plane was drawn and where along the axis the splitting plane was drawn.

Exemplary Bounding Volumes

Figure 5A:
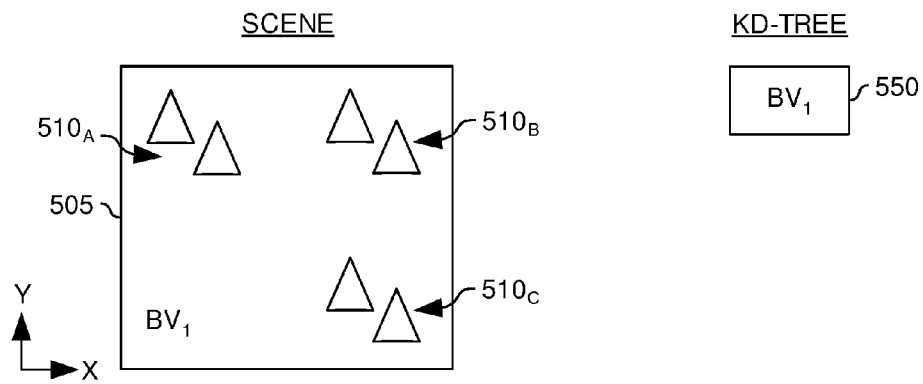
FIGS. 5A-5C illustrate a two-dimensional space to be rendered by an image processing system and a corresponding spatial index created by an image processing system, according to one embodiment of the invention.
Figure 5B:
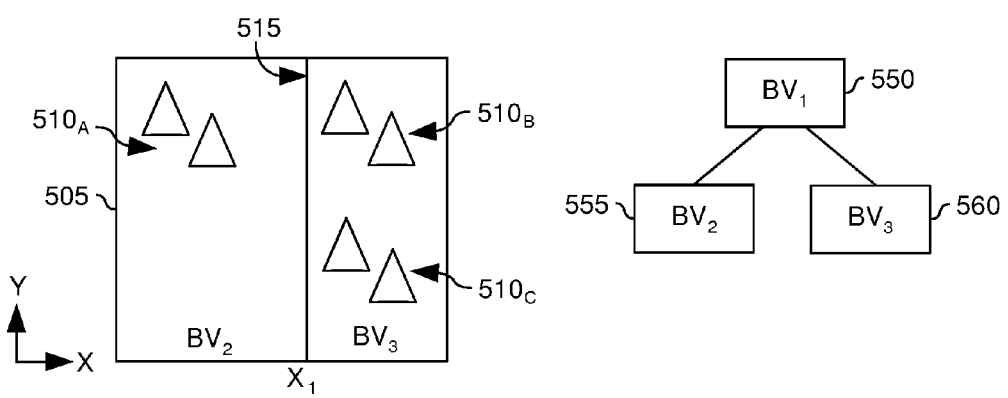
Figure 5C:
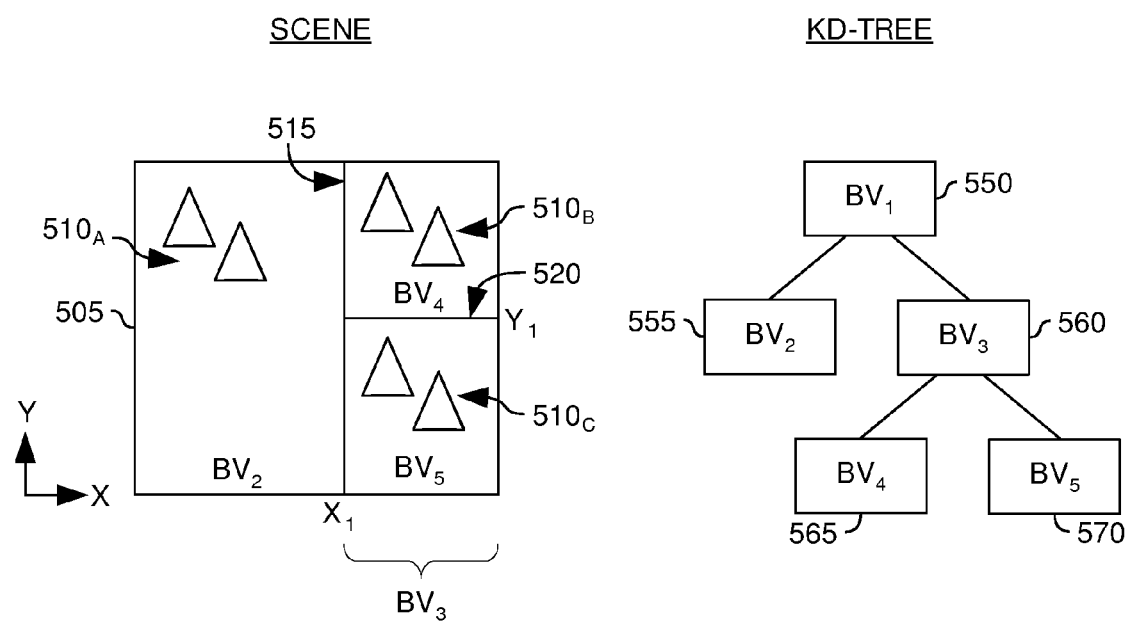

FIGS. 5A-5C illustrate a two-dimensional space to be rendered by an image processing system and a corresponding kd-tree. For simplicity, a two-dimensional scene is used to illustrate the building of a kd-Tree, however kd-Trees may also be used to represent three-dimensional scenes. In the two-dimensional illustration of FIGS. 5A-5C splitting lines are illustrated instead of splitting planes, and bounding areas are illustrated instead of bounding volumes as would be used in a three-dimensional structure. However, one skilled in the art will quickly recognize that the concepts may easily be applied to a three-dimensional scene containing objects.

FIG. 5A illustrates a two-dimensional scene 505 containing primitives 510 to be rendered in the final picture to be displayed on a monitor 510. The largest volume which represents the entire volume of the scene is encompassed by bounding volume 1 ($BV_1$). In the corresponding kd-Tree this may be represented by the top level node 550, also known as the root or world node. In one embodiment of an image processing system, an image processing system may continue to partition bounding volumes into smaller bounding volumes when the bounding volume contains, for example, more than two primitives. As noted earlier the decision to continue partitioning a bounding volume into smaller bounding volumes may be based on many factors, however for ease of explanation in this example the decision to continue partitioning a bounding volume is based only on the number of primitives. As can be seen in FIG. 5A, $BV_1$ contains six primitives, therefore kd-Tree construction algorithm may partition $BV_1$ into smaller bounding volumes.

FIG. 5B illustrates the same two-dimensional scene 505 as illustrated in FIG. 5A. However, in FIG. 5B the tree construction algorithm has partitioned $BV_1$ into two smaller bounding volumes $BV_2$ and $BV_3$. The partitioning of $BV_1$, was accomplished, by drawing a splitting plane $SP_1$ 515 along the x-axis at point $x_1$. This partitioning of $BV_1$ is also reflected in the kd-Tree as the two nodes 555 and 560, corresponding to $BV_2$ and $BV_3$ respectively, under the internal or parent node $BV_1$ 550. The internal node representing $BV_1$ may now store information such as, but not limited to, pointers to the two nodes beneath $BV_1$ (e.g., $BV_2$ and $BV_3$), along which axis the splitting plane was drawn (e.g., x-axis), and where along the axis the splitting plane was drawn (e.g., at point $x_1$).

The kd-Tree construction algorithm may continue to partition bounding volume $BV_3$ because it contains more than the predetermined threshold of primitives (e.g., more than two primitives). However, the kd-Tree construction algorithm may not continue to partition bounding volume $BV_2$, because bounding volume $BV_2$ contains less than or equal to the number of primitives (e.g., only two primitives $510_A$). Nodes which are not partitioned or sub-divided any further, such as $BV_2$, are referred to as leaf nodes.

FIG. 5C illustrates the same two-dimensional scene 505 as illustrated in FIG. 5B. However, in FIG. 5C the kd-Tree construction algorithm has partitioned $BV_3$ into two smaller bounding volumes $BV_4$ and $BV_5$. The kd-construction algorithm has partitioned $BV_3$ using a partitioning plane along the y-axis at point $y_1$. Since $BV_3$ has been partitioned into two sub-nodes it may now be referred to as an internal node. The partitioning of $BV_3$ is also reflected in the kd-Tree as the two leaf nodes 565 and 570, corresponding to $BV_4$ and $BV_5$ respectively. $BV_4$ and $BV_5$ are leaf nodes because the volumes they represent are not further divided into smaller bounding volumes. The two leaf nodes, $BV_4$ and $BV_5$, are located under the internal node $BV_3$ which represents the bounding volume which was partitioned in the kd-Tree.

The internal node representing $BV_3$ may store information such as, but not limited to, pointers to the two leaf nodes (i.e., $BV_4$ and $BV_5$), along which axis the splitting plane was drawn (i.e., y-axis), and where along the axis the splitting plane was drawn (i.e., at point $y_1$).

The kd-Tree construction algorithm may now stop partitioning the bounding volumes because all bounding volumes located within the scene contain less than or equal to the maximum predetermined number of primitives which may be enclosed within a bounding volume. The leaf nodes may contain pointers to the primitives which are enclosed within the bounding volumes each leaf represents. For example, leaf node $BV_2$ may contain pointers to primitives $510_A$, leaf node $BV_4$ may contain pointers to primitives $510_B$, and leaf node $BV_5$ may contain pointers to primitives $510_C$.

The resulting kd-Tree structure, or other spatial index structure, may be stored in the shared memory cache 110. The kd-Tree and the size of corresponding data which comprises the kd-Tree may be optimized for storage in the shared memory cache 110.

Iterative Ray Tracing Algorithm

According to one embodiment of the invention, transforming the ray tracing algorithm from a recursive algorithm into an iterative algorithm may enable efficient distribution of workload related to ray tracing amongst a plurality of processing elements. An iterative ray tracing algorithm, in contrast to a recursive ray tracing algorithm, may allow separate processing elements to perform operations relating to determining the color of a single pixel and allow efficient use of processor resources (e.g., memory cache). Efficient distribution of workload amongst a plurality of processing elements may improve ray tracing image processing system performance.

An algorithm for performing ray tracing may be recursive in the sense that it issues an original ray into a three-dimensional scene and finishes all ray tracing operations relating to the issued original ray (e.g., traces all secondary rays and performs all ray-object intersection tests) before issuing a subsequent original ray into the three-dimensional scene.

For example, an image processing system may use a recursive ray tracing algorithm to render a two-dimensional image from a three-dimensional scene. The image processing system using a recursive ray tracing algorithm may use a processing element to perform ray tracing. The processor may be used to traverse a ray through a spatial index, and to determine if the ray intersects any objects within a bounding volume of the spatial index. If the ray intersects an object contained within a bounding volume, the image processing system, using the same processor, may issue secondary rays into the three-dimensional scene to determine if they intersect any objects and, consequently, contribute color to the object intersected by the original ray. While performing operations related to determining if the secondary rays intersect objects within the three-dimensional scene, the processor may store information defining the original ray in the processor's memory cache.

If the processing element determines that the secondary rays intersect objects within the three-dimensional scene the image processing element may issue more secondary rays into the scene to determine if those secondary rays intersect objects and contribute color to the object intersected by the original ray. When performing calculations to determine if the secondary rays intersect objects within the three-dimensional scene, the processor may store previous secondary ray information in the processor's memory cache. By issuing more and more secondary rays into the scene, the image processing system may finally determine the total contribution of color from secondary rays to the object intersected by the original ray. From the color of the object intersected by the original ray and the contribution of color due to secondary rays, the color of the pixel through which the original ray passed may be finally determined.

Although the recursive ray tracing algorithm determines the color of the pixel through which the original ray passed, each time the image processing system issues more secondary rays into the three-dimensional scene, the recursive ray tracing image processing system places information which defines the previous rays (e.g., the original ray or previous secondary rays) into the memory cache of the processing element. The image processing system may store ray information in the cache in order to free registers which may be necessary to perform the calculations related to determining if the subsequent secondary rays intersect objects within the three-dimensional scene. Consequently, the recursive ray tracing image processing system may place a large (relative to the size of the cache) amount of information into the processors memory cache for a single pixel.

By storing large amounts of ray information in the memory cache of the processor, there is little or no space in the processor's memory cache for information which defines the objects within the three-dimensional scene (i.e., object geometry data). This information may need to be frequently fetched from main memory into the memory cache in order to perform operations to determine if the original or secondary rays intersect objects within the three-dimensional scene (thereby "thrashing" the cache). Therefore, the limits of an image processing system which uses the recursive ray tracing technique may be limited by the access time to fetch information from main memory and place it in the processor's memory cache.

However, according to embodiments of the invention, the ray tracing algorithm may be partitioned into an iterative ray tracing algorithm. The iterative ray tracing algorithm may allow separate processing elements to perform portions of the ray tracing algorithm. By allowing separate processing elements to perform portions of the ray tracing algorithm, the amount of information which needs to be cached (e.g., original rays and secondary rays) may be reduced. Furthermore, according to embodiments of the invention, the iterative ray tracing algorithm may be used in conjunction with the low-latency high-bandwidth communications network and the shared memory cache 110 in order to improve the performance of a ray tracing image processing system.

The low-latency high-bandwidth communications network of inboxes, as described above with regards to FIGS. 3A-3C, may be used to pass or send data processing information (e.g., information defining original rays and secondary rays) which has little use when tracing subsequent rays or rendering subsequent frames, according to embodiments of the invention. In addition, according to embodiments of the invention, the ray tracing image processing system may use a shared coherent memory cache to store information which may be used by the image processing system when tracing subsequent rays or performing ray tracing for a subsequent frame.

Figure 6:
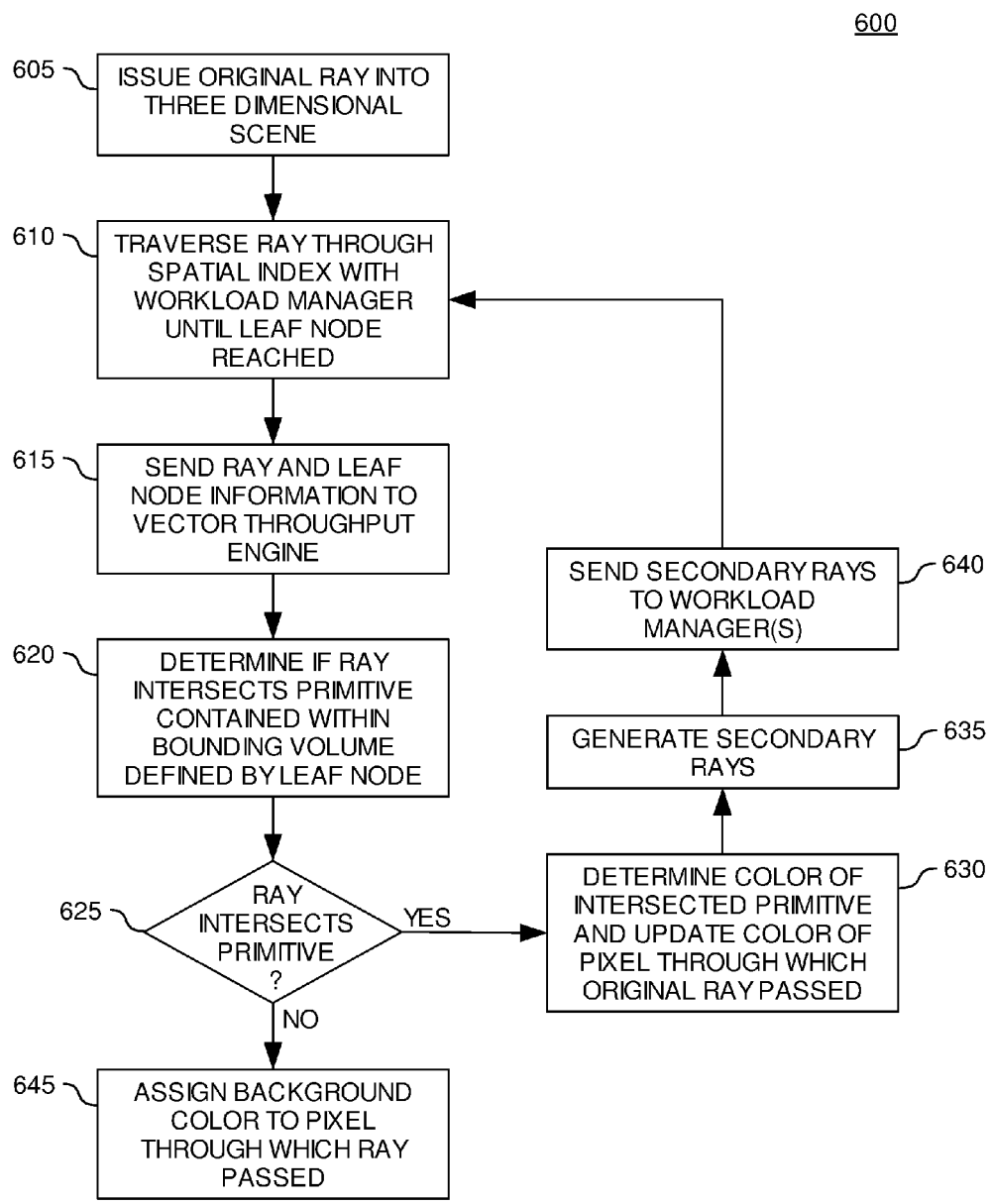
FIG. 6 is a flowchart illustrating an exemplary method of performing ray tracing, according to one embodiment of the invention.

FIG. 6 is a flowchart which illustrates a partitioned and thus iterative ray tracing algorithm or method 600 which may be used in a multi processor image processing system, according to one embodiment of the invention. The method 600 begins at step 605 when the image processing system issues an original ray into the three-dimensional scene. The original ray may pass through a pixel as it traverses into the three-dimensional scene. The original ray may be used to determine the color of the pixel through which the original ray passed.

Next, at step 610 the image processing system may use a use a workload manager 205 processing element to traverse the spatial index (e.g., kd-Tree). The spatial index may be stored within the shared memory cache 110 of the image processing system. Traversing the kd-Tree may include performing calculations which determine if the original ray intersects bounding volumes which are defined by nodes within the spatial index. Furthermore, traversing the spatial index may include taking branches to nodes which defined bounding volumes intersected by the ray. A workload manager 205 may use the coordinates and trajectory of an issued ray (e.g., the original ray) to determine if the ray intersects bounding volumes defined by the nodes in the spatial index. The workload manager 205 may continue traversing the spatial index until the original ray intersects a bounding volume which contains only primitives (i.e., a leaf node).

At step 615, after the workload manager 205 has traversed the original ray to a leaf node, the workload manager 205 may send the original ray and information which defines the leaf node to a vector throughput engine 210. The workload manager 205 may send information which defines the original ray and the leaf node (e.g., trajectory of the ray, pixel through which the original ray passed, bounding volume defined by the leaf node, etc.) to the vector throughput engine 210. The workload manager 205 may send the information to the vector throughput engine 210 by writing the information defining the ray and the intersected leaf node to the inbox of the vector throughput engine 210.

By coupling the pixel information with the information which defines the original ray, there is no need to send the original ray back to the workload manager 205 if the vector throughput engine 210 determines that the ray intersected an object and, consequently, determines a color of the pixel. According to one embodiment of the invention, the vector throughput engine 210 may use the pixel information to update the color of the pixel by writing to memory location within a frame buffer (e.g., stored in the shared memory cache 110) which corresponds to the pixel. By updating the pixel color as secondary rays intersect objects within the three-dimensional scene, the number of rays relating to the same pixel that need to be stored (e.g., in cache memory) may be reduced.

After the workload manager 205 sends the original ray information to the vector throughput engine 210, the image processing system may issue a subsequent original ray into the three-dimensional scene. The workload manager 205 may immediately begin traversing this subsequently issued original ray through the spatial index after the workload manager 205 has sent the original ray to a vector throughput engine 210. Thus, the workload manager 205 may be continuously traversing rays through the spatial index, rather than wait until the determination of whether the original ray intersected an object is complete, as in a recursive ray tracing algorithm. Furthermore, the workload manager 205 may be traversing rays through the spatial index as the vector throughput engine 210 is determining if previously issued rays intersect objects within the bounding volumes defined by leaf nodes. According to one embodiment of the invention, vector throughput engines 210 may be responsible for performing ray-primitive intersection tests. That is, the vector throughput engines 210 may determine if a ray intersects any primitives contained within the bounding volume defined by the leaf node.

Therefore, at step 620, a vector throughput engine 210 that receives the ray and leaf node information in its inbox may perform ray-primitive intersection tests to determine if the ray intersects any primitives within the bounding volume defined by the leaf node. The geometry which defines the primitives may be stored within the shared memory cache 110, and thus may not need to be fetched from main memory. By storing the geometry for primitives in the shared memory cache 110, the iterative ray tracing algorithm may not need to fetch the geometry from main memory as is the case with the recursive ray tracing algorithm. If the vector throughput engine 210 determines that the original ray intersected a primitive contained within the bounding volume defined by the leaf node, the vector throughput engine 210 may proceed to step 630.

At step 630, the vector throughput engine 210 may determine the color of the intersected primitive at the point which the original ray intersected the primitive. For example, the color of the primitive may be stored in the shared memory cache 110 and the vector throughput engine 210 may read the color information from the shared memory cache 210.

After determining the color of the primitive at the ray-primitive intersection point, the vector throughput engine 210 may update the color of pixel through which the ray passed. This may be accomplished, for example, by writing to a memory location within a frame buffer which corresponds to the pixel through which the original ray passed. By updating the pixel information as a ray-primitive intersection is determined and before determining the color contributions for all secondary rays relating to a original ray, the amount of information which may need to be stored in a memory cache may be reduced. In contrast, a recursive ray tracing algorithm may not store the color of the pixel in a frame buffer until all color contributions from secondary rays have been determined, which increases the amount of information which may need to be stored in a processor's memory cache.

After updating the pixel color, the vector throughput engine 210 may proceed to step 635, where, the vector throughput engine 210 may generate secondary rays. As described previously with regards to FIG. 4, a ray tracing image processing system may use secondary rays determine additional color contribution to the intersected object and thus to the pixel through which the original ray passed. Secondary rays may be, for example, reflected rays, transmitted (refracted) rays, or shadow rays. Generating secondary rays may include, for example, determining the trajectory of the secondary rays based on the trajectory of the original ray, surface properties of the intersected object, and an angle of intersection of the original ray with the intersected object.

After generating secondary rays, the vector throughput engine 210, at step 640 may send the secondary rays to a workload manager 205. The vector throughput engine 210 may send the secondary rays to a workload manager 205 by placing the information which defines the secondary rays (e.g., trajectory, information defining the pixel through which the original ray passed, etc.) in an inbox 115 of a workload manager 205. According to one embodiment of the invention, the vector throughput engine 210 may send the secondary rays to the workload manager 205 which traversed the original ray through the spatial index. However, according to another embodiment of the invention, the image processing system may contain a plurality of workload managers and the vector throughput engine 210 may send the secondary rays to a workload manager which did not traverse the original ray through the spatial index.

After sending the secondary rays to a workload manager 205, the vector throughput engine 210 may retrieve other information defining rays from an inbox which may be waiting to have ray-primitive intersection tests performed. The rays waiting in the vector throughput engine's 210 inbox may have been previously traversed through a spatial index by a workload manager 205. Therefore, the vector throughput engine 210 may perform more ray-primitive intersection tests to determine if rays (i.e., original or secondary) intersect objects within bounding volumes defined by leaf nodes. Thus, the vector throughput engine 210 may continuously perform operations related to ray-primitive intersection tests, determining primitive colors, updating pixel colors, and generating secondary rays.

After receiving a secondary ray from a vector throughput engine 210, a workload manager 205 may execute steps 610 and 615, as described above, to determine if the secondary ray intersects a leaf node.

Returning to step 625, if the vector throughput engine 210 determines that the ray did not intersect a primitive contained within bounding volume defined by the leaf node, the vector throughput engine 210 may assign the pixel through which the original ray passed a background color of the three-dimensional scene. The background color may be assigned to the pixel because the original ray did not intersect any primitives contained within the three-dimensional scene. However, according to other embodiments of the invention, if the ray did not intersect any primitives contained within the leaf-node bounding volume, the vector throughput engine 210 may send the ray back to a workload manager 205 such that the workload manager 205 may traverse the ray through the spatial index again to determine if the ray intersected any other leaf nodes containing primitives.

Exemplary Use of an Iterative Ray Tracing Algorithm

Figure 7:
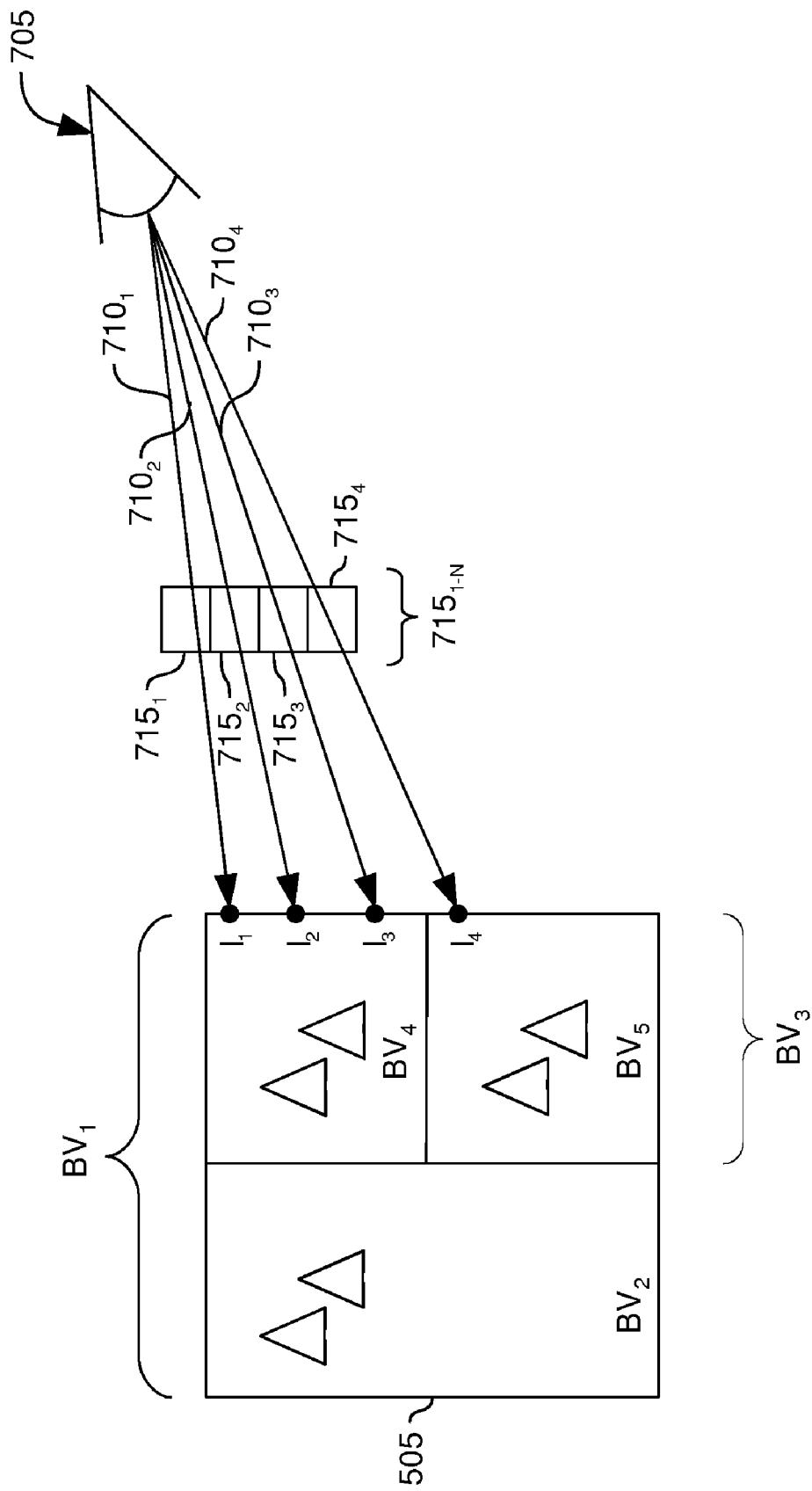
FIG. 7 is an exemplary three-dimensional space to be rendered by an image processing system, according to one embodiment of the invention.

FIG. 7 illustrates exemplary rays issued from an image processing system into a three-dimensional scene 505, according to one embodiment of the invention. For clarity, the three-dimensional scene 505 is the same as the three-dimensional scene used in FIGS. 5A-5C to illustrate the construction of a kd-tree. Therefore, the kd-tree which corresponds to the three-dimensional scene 505 is the same as the kd-tree which was constructed with regards FIGS. 5A-5C. As illustrated in FIG. 7, a viewer 705 represents the origin of a plurality of original rays $710_{1-4}$ which may be issued into the three-dimensional scene 505 by the image processing system. As each original ray $710_{1-4}$ is issued into the three-dimensional scene, the original rays may first pass through a corresponding pixel in a grid (frame) of pixels 715. Although only four pixels 715 and four original rays $710_{1-4}$ are illustrated in FIG. 7, to render a final two-dimensional image from a three-dimensional scene many more pixels may be necessary, and many more original rays may be issued.

A first original ray $710_1$ may be issued by the image processing system and pass through a first pixel $715_1$. The first original ray $710_1$ may intersect bounding volume 4 ($BV_4$) at an intersection point $l_1$. To facilitate understanding, the image processing system in this example may follow a pattern of issuing rays starting from the top of the grid of pixels 715 and continue issuing rays, one ray per pixel, moving down the grid of pixels until a ray has been issued for each pixel in the grid of pixels.

A second original ray $710_2$ and a third original ray $710_3$ may also be issued by the image processing system which may pass through a second pixel $715_2$ and a third pixel $715_3$ respectively. The second original ray $710_2$ and the third original ray $710_3$ may also intersect $BV_4$ at a second intersection point $l_2$ and a third intersection point $l_3$, respectively. Thus the first original ray $710_1$, the second original ray $710_2$, and the third original ray $710_3$ all intersect the same bounding volume. Furthermore, a fourth original ray $710_4$ may be issued by the image processing system and may pass through a fourth pixel $815_4$. The fourth original ray $710_4$, in contrast to the first three original rays $710_{1-3}$, may intersect bounding volume 5 ($BV_5$) at intersection point $l_4$.

Figure 8A:
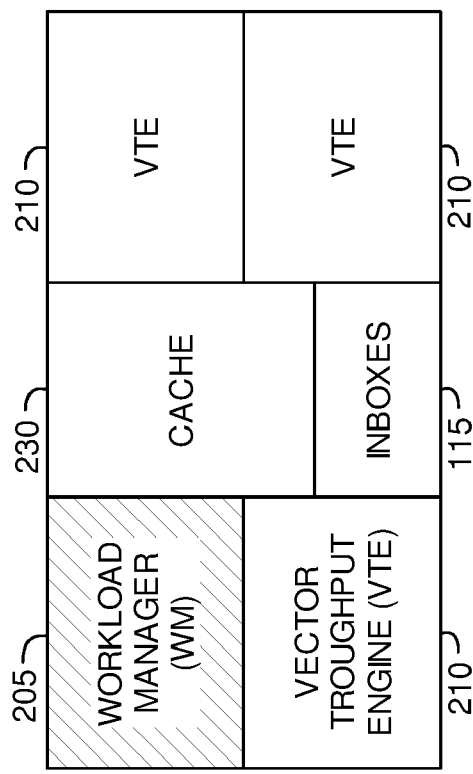
Figure 8A:
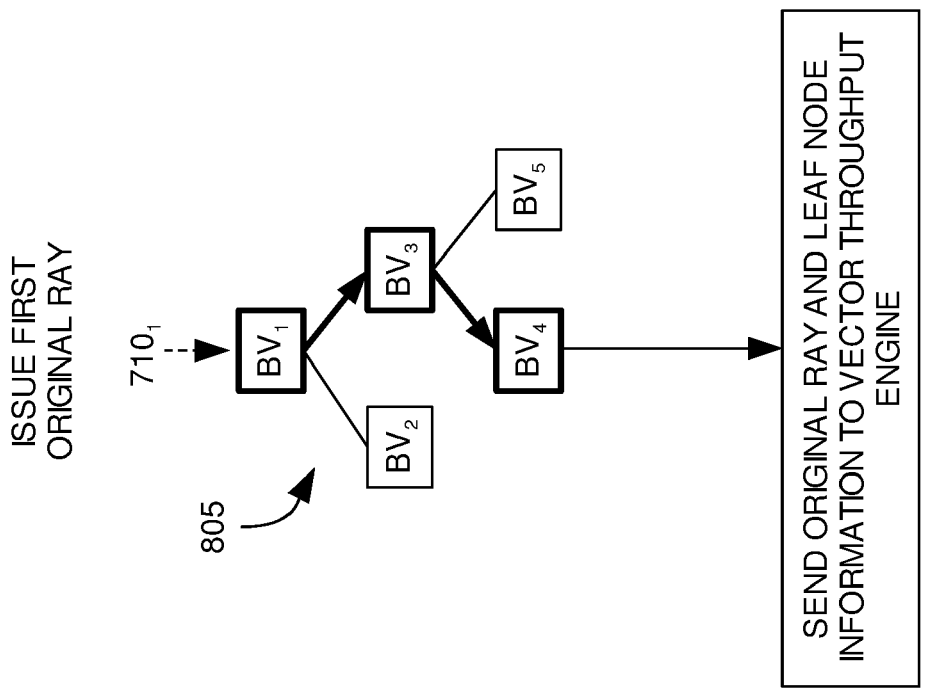

FIG. 8A illustrates the traversal of the first original ray $710_1$ ray through a spatial index 805 (e.g., a kd-tree). Furthermore, as indicated by the shaded box 205, FIG. 8A illustrates a workload manager 205 performing operations related to the traversal of the first original ray $710_1$ through the spatial index 805. The workload manager 205 may traverse the ray through the spatial index 805 by taking branches to nodes defining bounding volumes intersected by the ray until a leaf node is reached (as illustrated in FIG. 8A by the darkened branches and nodes). As illustrated in FIG. 7 the original ray $710_1$ intersects $BV_4$, therefore, the workload manager 205 will traverse the first original ray $710_1$ to the leaf node which defines $BV_4$. After traversing the ray to a leaf node, the workload manager 205 may send the first original ray $710_1$ (e.g., send information which defines the first original ray $710_1$ and information which defines the pixel $715_1$ through which the first original ray passed) and information defining the intersected leaf node (i.e., $BV_4$) to a vector throughput engine 210.

According to embodiments of the invention, after the workload manager 205 sends the first original ray $710_1$ to a vector throughput engine 210, the workload manager 205 may begin traversing the second original ray $710_2$ through the spatial index. Thus, the workload manager 205 may be constantly traversing rays through the spatial index 805 while the vector throughput engines 210 are determining if rays intersect objects within the bounding volumes defined by traversed to leaf nodes.

Figure 8B:
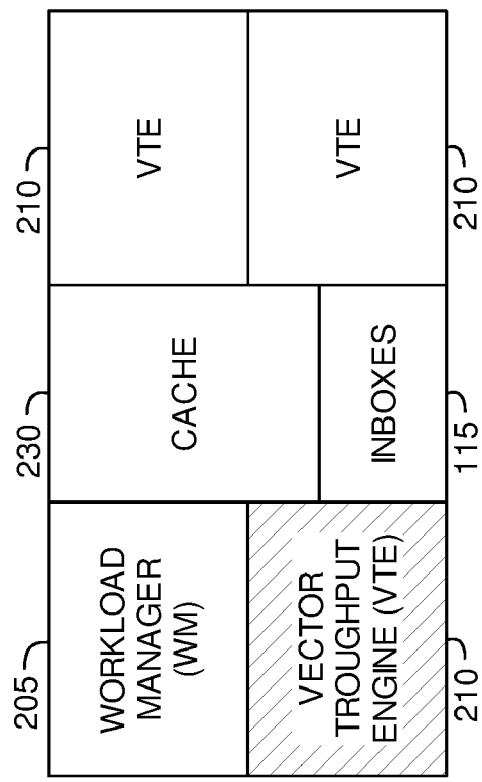
Figure 8B:
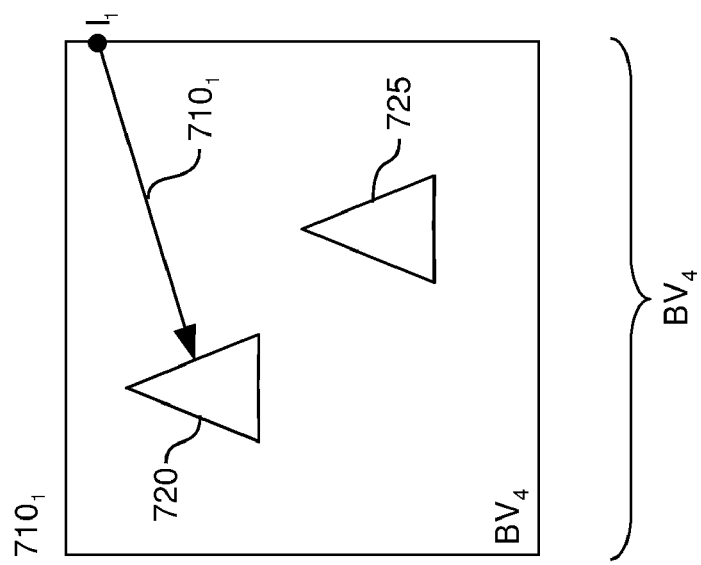

FIG. 8B illustrates the first original ray $710_1$ traversing through the bounding volume 4 (BV4). Furthermore, as indicated by the shaded box, FIG. 8B illustrates the vector throughput engine 210 performing ray-primitive intersection tests after the vector throughput engine has received the information defining the first original ray $710_1$ and the information defining the bounding volume $BV_4$. As described with regards to FIG. 6, the vector throughput engine 210 may execute ray-primitive intersection tests to determine if the original ray $710_1$ intersects primitives contained within the bounding volume $BV_4$.

The vector throughput engine 210 may perform tests with the first original ray $710_1$ against a first object 720 within the bounding volume $BV_4$, and against a second object 725 within the bounding volume $BV_4$. As illustrated in FIG. 8B, the vector throughput engine 210 may determine that the first original ray $710_1$ intersects the first object 720.

As described previously with respect to method 600, after determining that the first original ray $710_1$ intersects an object, the vector throughput engine 210 may determine the color of the first object 720 at the point which the first original ray $710_1$ intersected the first object 720. After determining the color of the object 720 at the intersection point, the vector throughput engine 210 may update the color of the pixel $715_1$ through which the first original ray $710_1$ passed (e.g., by writing to a frame buffer memory location which corresponds to the pixel $715_1$).

After determining the color of the object 720 at the intersection point, the vector throughput engine 210 may generate secondary rays. For example, as illustrated in FIG. 8C the vector throughput engine 210 may generate a reflected ray 730 and a transmitted (refracted) ray 735. Both secondary rays (730 and 735) originate from the point where the first original ray $710_1$ intersected the object 720. As described above, the secondary rays may be used to determine additional color contribution to the object at the point which the first original ray $710_1$ intersected the object 720. The generation of the secondary rays may include determining a trajectory for each secondary ray and tagging the secondary ray such that the additional color contribution from the secondary ray may be used to update the color of the pixel $715_1$ through which the first original ray $710_1$ passed.

After generating the secondary rays (730 and 735), the vector throughput engine 210 may send the secondary rays (730 and 735), via an inbox, to a workload manager 205. A workload manager 205 which receives the secondary rays (730 and 735) may use the information which defines the secondary rays (i.e., trajectory of secondary rays) to traverse the spatial index 805. For example, the shaded box in FIG. 8D illustrates a workload manager 205 which may traverse the spatial index 805 with a secondary ray (e.g., 730) which was generated by a vector throughput engine 210. The workload manager 205 may traverse the secondary ray to a leaf node. After the secondary ray has been traversed to a leaf node, the workload manager 205 may send the secondary ray and information defining the bounding volume intersected by the secondary ray to a vector throughput engine 210 to determine if the secondary ray intersects any objects with the bounding volume intersected by the secondary ray.

As the vector throughput engines 210 determine that the original ray or secondary rays strike objects within the three-dimensional scene, the color of the pixel through which the original ray passed may be updated within the frame buffer. According to embodiments of the invention, all secondary rays relating to an original ray, and thus to the pixel through which the original ray passed, may be traced through the three-dimensional scene and their color contributions saved in the frame buffer to determine the final color of the pixel. However, according to other embodiments of the invention, a finite number of secondary rays relating to the original ray may be traced through the three-dimensional scene to determine the color of the pixel. By limiting the number of secondary rays which are traced through the three-dimensional scene and thus contribute to the color of the pixel, the amount of processing necessary to determine a final color of the pixel may be reduced.

Flexible and Efficient Data Organization for Acceleration Data Structure Nodes

As stated above, in a multiple core processing element network 200, many workload managers 205 and vector throughput engines 210 may work together to perform tasks related to rendering a ray traced image from a three-dimensional scene. An acceleration data structure (spatial index) may be used to facilitate or accelerate the process of performing ray tracing. In order for the plurality of processing elements in a multiple core processing element network 200 (e.g., workload managers 205 and vector throughput engines 210) to perform these tasks rapidly, the image processing system may store a copy of an acceleration data structure (spatial index) within the cache 230 of each of the multiple core processing elements (e.g., $220_1$-$220_N$). In order to store a copy of the spatial index in a cache 230 (an area of memory with limited capacity), the image processing system must build an efficient and relatively small spatial index.

Furthermore, the image processing system may be used in conjunction with a physics engine (e.g., in a game system) in order to provide animation. The physics engine may simulate physical phenomenon, for example, by moving objects (e.g., primitives or triangles) within the three-dimensional scene, and the image processing system may render a two-dimensional image reflecting the positions of the objects within the three-dimensional scene. In order to move the objects within the three-dimensional scene, the physics engine may alter the position of the primitives within the spatial index to reflect the new positions of the objects. The manipulation of the spatial index may need to be fast enough that the image processing system can use the altered positions of the objects to render a frame (two-dimensional image) and continue to render frames at a pace sufficient to provide realistic animation (e.g., 30-60 frames per second).

According to one embodiment of the invention, one technique of organizing scene data and creating an efficient spatial index may be to store primitive information separate from the spatial index and to use pointers or links from the nodes of the spatial index to buffers containing information which defines the primitives (triangles) within the three-dimensional scene. Consequently, the spatial index may be stored separately from the information defining the triangles within the three-dimensional scene and the spatial index may be considerably smaller than if triangle information was stored within the spatial index. Furthermore, this data organization may allow triangles and vertexes to be shared, and may allow manipulation of the spatial index without perturbing the overall structure of the spatial index.

Figure 9:
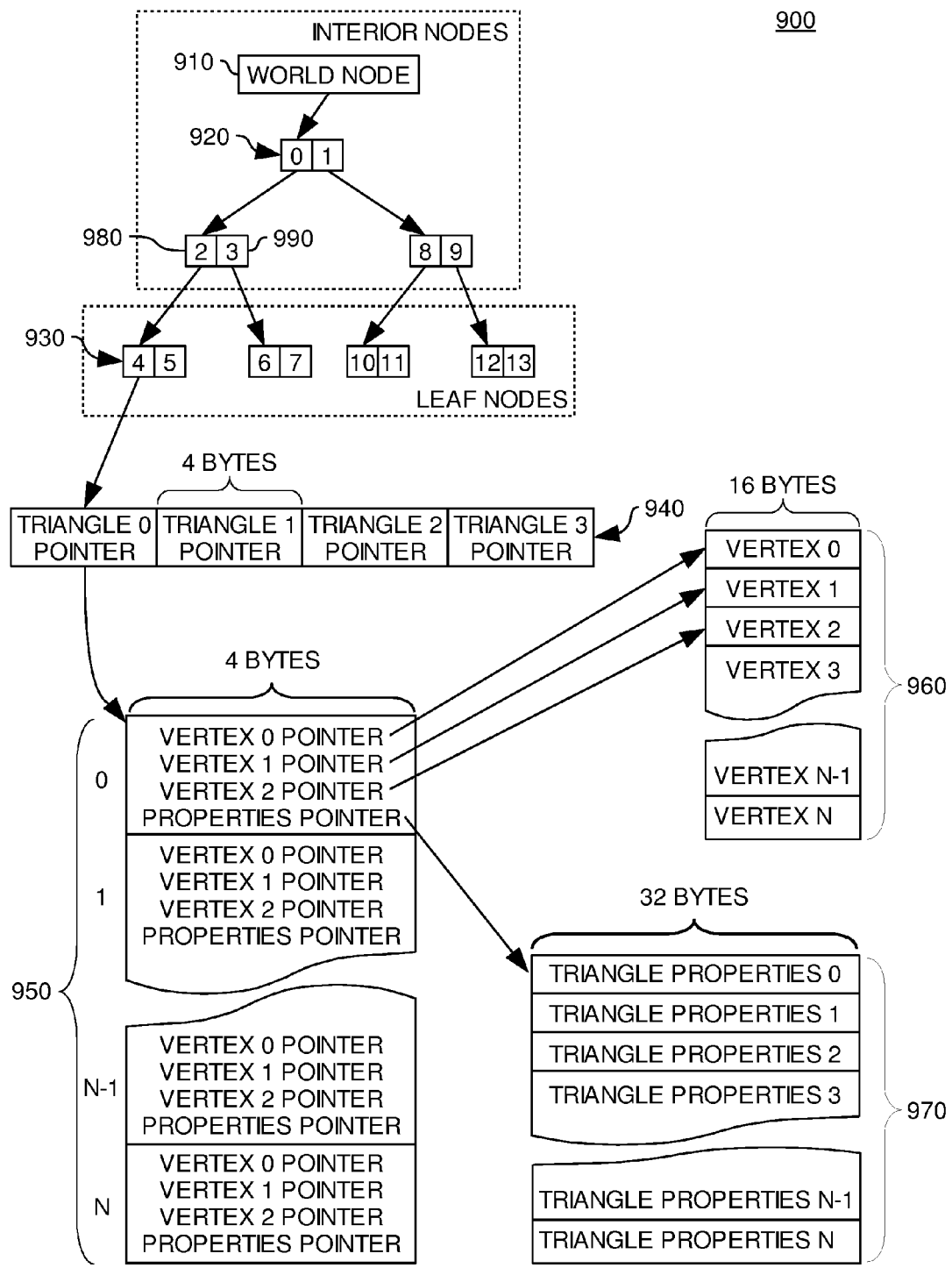
FIG. 9 illustrates an exemplary organization of data in an image processing system, according to embodiments of the invention.

FIG. 9 illustrates an exemplary organization of data and a spatial index 900 for a three-dimensional scene, according to one embodiment of the invention. The spatial index 900 contains a world node data structure 910 which contains pointers or links to child node data structures (e.g., internal node data structures 920). The internal node data structures may contain pointers or links to other internal node data structures or to leaf node data structures (e.g., leaf node data structures 930). Leaf node data structures may contain pointers or links to a specific location within a triangle pointer list buffer. For example, leaf node 960 contains a pointer to the triangle pointer list buffer 940. A triangle pointer list buffer 940 may contain pointers to triangle data structures contained within a triangle data buffer 950. Each leaf node may have a distinct triangle pointer list within the triangle pointer list buffer 940. A triangle pointer list buffer 940 may contain a pointer to a triangle data structure for each triangle which is located within the bounding volume corresponding to a leaf node. Each triangle data structure may be stored within a triangle buffer 950 and may contain pointers to vertex data structures contained within a vertex buffer 960. The triangle data structure may also contain a pointer to a triangle properties data structure contained within a triangle properties buffer 970. A vertex data structure may indicate the coordinates of the three vertexes of a triangle and a properties data structure may defined properties of a triangle (e.g., color and texture of the triangle).

The nodes of the spatial index (e.g., interior node 920, leaf node 930) may be stored within a spatial index buffer which may be stored in a separate memory location than the triangle list buffer 940, the triangle buffer 950, the vertex buffer 960, and/or the triangle properties buffer 970. This organization of scene data and the spatial index may allow triangle and vertex sharing amongst multiple processing elements, and rapid manipulation of information defined by or within the spatial index without perturbing the overall structure of the spatial index.

FIG. 10 illustrates a world (root) node data structure 1000, according to embodiments of the invention. The world node data structure 1000 may utilize thirty-two bytes of memory space. The first eight bytes of the world node data structure 1000 may contain information which defines what type of node the world node is, specifically either a leaf node or an interior or internal node. Since the bounding volume defined by the world node is partitioned into smaller bounding volumes (sub-volumes) the world node is an interior node. Consequently, the first eight bytes of the world node data structure may contain information which defines the world node as an interior node. Furthermore, as described further below with respect to FIG. 11, some portion (e.g., the first eight bytes as shown) of the world node data structure may also contain information defining the splitting plane which partitions the bounding volume defined by the world node, and at least one pointer to a child node on a lower level of the spatial index than the world node 910.

Another portion (e.g., the next twelve bytes of data) of the world node data structure 1000 may define a first bounding-volume coordinate or world coordinate A (e.g., the left most bounding volume coordinate) of the three-dimensional scene or world which is partitioned by the spatial index 900. Still another portion (e.g., another twelve bytes of data immediately following the previous twelve bytes) may define a second bounding-volume coordinate or world coordinate B (e.g., the right most bounding volume coordinate) of the three-dimensional scene. Together the first bounding-volume coordinate and the second bounding-volume coordinate may adequately define the bounding volume which encompasses the entire three-dimensional scene to be rendered by the image processing system.

FIG. 11 illustrates an exemplary interior node data structure 1100 according to one embodiment of the invention. An interior node may be a node within the spatial index which is partitioned by a splitting plane resulting in two bounding volumes (sub-volumes) corresponding to two nodes in the spatial index. For example, node 920 is an interior node because the corresponding bounding volume is partitioned by a splitting plane and node 920 branches to two nodes (i.e., interior node 980 and interior node 990) corresponding to the two sub-volumes created by the splitting plane. An interior node data structure 1100 may contain eight bytes of data. Each interior node of the spatial index may have a corresponding interior node data structure which contains eight bytes of data. The first bit within the first byte of data in the interior node data structure 110 may indicate whether or not the node is an interior node. For example, if the first bit of the interior node data structure 1100 is low ('0' or not asserted) the node may be an interior node.

The next two bits of the first byte in the interior node data structure 1100 may indicate the axis along which the splitting plane is drawn. For example, if the two bits are low (i.e., '00'), the splitting plane may be along the x-axis. If the first of the two bits is low and the second bit high (i.e., '01'), the splitting plane may be along the y-axis. Further, if the first of the two bits is high and the second bit low (i.e., '10'), the splitting plane may be along the z-axis. However, other embodiments of the invention may identify the splitting plane axis using different combinations of the state of the two bits. The last five bits in the first byte of the interior node data structure 1100 may be reserved for future use.

The next three bytes of the interior node data structure 1100 may define or point to a memory location of the child node created by the splitting plane. According to one embodiment of the invention, the three bytes may identify an offset from a spatial-index base address where the information defining the child node may be stored. Each interior node is eight bytes, and, therefore, may be accessed using an offset which indexes eight bytes.

Data structures for interior nodes of the spatial index may be stored contiguously. For example, the left child node (e.g., an interior node) data structure may be stored immediately preceding the right child node data structure in memory. Since an interior node data structure has a constant size (e.g., eight bytes) and the interior nodes are stored contiguously, a processing element utilizing the spatial index may find the right child node data structure, for example, by examining the eight bytes of memory following the eight bytes of memory defining the left child node. By having a pointer to only one child node, in contrast to two pointers, the internal node data storage structure 1100 thereby reduces the amount of memory space required to identify the locations of the child nodes of an interior node.

The last four bytes of the interior node data structure 1100 may define the location or coordinates of the splitting plane along the splitting axis. As described above, a splitting plane partitions a bounding volume and creates two bounding volumes which correspond to the child nodes beneath the interior node. The location of the splitting plane may be used during ray-bounding volume intersection tests to determine if a ray intersects the bounding volumes corresponding to the child nodes.

Another type of node in the spatial index is a leaf node. Leaf nodes are nodes corresponding to bounding volumes within the three-dimensional scene which are not partitioned. FIG. 12 illustrates an exemplary leaf node data structure 1200 which may be used to define a leaf node (e.g., leaf node 940), according to embodiments of the invention. Similar to an interior node data structure 1100, a leaf node data structure 1200 may contain eight bytes of data. The first bit of the first byte of data in the leaf node data structure 1200 may indicate that the node is a leaf node. In contrast to the interior node data structure 1100 whose first bit may be low or a '0' to indicate the node is an interior node, the first bit of the leaf node data structure 1200 may be the opposite of the first bit of the interior node (e.g., high or a '1') to indicate the node is a leaf node. However, according to other embodiments of the invention, the first bit of the interior node data structure 1100 may be high or a '1' to indicate the node is an interior node while the first bit of the leaf node data structure 1200 may be low or a '0' to indicate the node is a leaf node. For a leaf node, because there is no splitting plane, which used the second and third bits to define a split orientation for an interior node, these bits may be reserved in the leaf node data structure 1200 for future uses.

The last five bits of the first byte in the leaf node data structure 1200 may be used to identify a processing element (e.g., vector throughput engine 210) responsible for performing ray-primitive intersection tests for rays which intersect the bounding volume corresponding to a leaf node. By identifying the processing element responsible for performing ray-primitive intersection tests in the leaf node data structure 1200, the image processing system may partition the workload amongst various processing elements in a multiple processing element network 200. Furthermore, the image processing system may modify the workload experienced by different processing elements by assigning more or less leaf nodes to various processing elements. The five bits may, for example, identify the processing element using a thread 'id' or thread identification which is assigned to a particular processing thread.

The second, third, and fourth bytes of the leaf node data structure 1200 may indicate how many triangles are within the bounding volume corresponding to the leaf node. The fourth through eighth bytes of the leaf node data structure 1200 may contain a pointer (a triangle list pointer) which points to a specific location within the triangle pointer list buffer 940. The triangle pointer list buffer 940 may contain a list of pointers to triangles located within the three-dimensional scene. An image processing system may use the triangle list pointer and the number of triangles in the corresponding bounding volume to access specific information relating to the triangles within the bounding volume corresponding to the leaf node. For example, by using the triangle list pointer and the number of triangles in the bounding volume, the image processing system may determine the location or properties of the triangles within the bounding volume corresponding to the leaf node.

The pointers to triangles in the triangle list may be stored contiguously in the triangle pointer list buffer 940. Therefore, a processing element may find all of the triangles within the bounding volume corresponding to the leaf node using the pointer to the triangle list and the triangle count. In contrast to storing pointers to each triangle in the leaf node data structure 1200, by storing the list of pointers contiguously and using only a pointer to the list of triangles and the number of triangles in the bounding volume, the size of the leaf node data structure 1200 may be reduced.

Furthermore, by only identifying the number of triangles in the triangle list and a pointer to the list of triangles in the leaf node data structure 1200 rather than defining the triangles themselves (e.g., vertexes and triangle properties), the size of the leaf node data structure 1200 and consequently the spatial index 900 in general may be kept to a minimum. Furthermore, when the spatial index needs to be modified (e.g., when primitives such as triangles move within the three-dimensional scene), the modifications to the spatial index may be minimal.

For example, coordinates of triangle vertexes within leaf node data structure 1200 may need to be modified in response to a movement of an object within the bounding volume (e.g., generated by the physics engine). However, according to embodiments of the invention, in response to the movement of primitives or triangles within the bounding volume corresponding to the leaf node, only the triangle count and the triangle list pointer may need to be modified in the leaf node data structure 1200.

FIG. 13 illustrates an exemplary triangle list 1300 which may be stored in a triangle pointer list buffer 940. The triangle list 1300 may be stored in a different location than the spatial index 900 (e.g., cache memory or system memory). The triangle list 1300 may be a list of pointers to triangle data structures. The triangle list 1300 may contain a four-byte triangle-pointer data structure 1305 for every triangle within the three-dimensional scene. The triangle pointer 1305 may point to or contain the address of a triangle data structure which is stored in a triangle buffer 950. The triangle pointers may be stored contiguously in memory. According to one embodiment of the invention, each leaf node within the spatial index may have a distinct triangle list 1300.

FIG. 14 illustrates an exemplary sixteen-byte triangle data structure 1400 which may be stored in a triangle buffer 950, according to one embodiment of the invention. The triangle buffer 950 may contain a triangle data structure 1400 for each and every triangle within the three-dimensional scene. The triangle data structures 1400 may be stored contiguously in memory. The order of the triangle data structures within memory may correspond to the order of the pointers in the triangle list. The triangle buffer 950 may be stored separately from the triangle list buffer 940 and the spatial index 900. The triangle buffer 950 may, for example, be stored within cache memory or system memory.

The first twelve bytes of the triangle data structure 1400 may contain vertex pointers which point to memory locations containing vertex data structures (described further below with regards to FIG. 15). As each triangle contains three vertexes, each triangle data structure 1400 may contain three vertex pointers, and each vertex pointer may utilize four bytes of the triangle data structure 1400. The remaining four bytes of the sixteen-byte triangle data structure 1400 may contain a triangle properties pointer. The triangle properties pointer may identify the location of a triangle properties data structure (described further below with regards to FIG. 16) which may contain information relating to the properties of the triangle.

FIG. 15 illustrates an exemplary vertex data structure 1500. The image processing system may store a plurality of vertex data structures in a vertex buffer 960. Because each triangle contains three-vertexes, the vertex buffer 960 may contain, for example, as many vertex data structures 1300 as three times the number of triangles within the three-dimensional scene. However, according to embodiments of the invention, vertexes may be shared between triangles within the three-dimensional scene. For example, if two triangles share the same vertex within the three-dimensional scene, the triangle data structures corresponding to those two triangles may point to the same vertex data structure within the vertex buffer 960. The vertex list may be stored in a vertex buffer, which may be within a separate memory device than the spatial index 900, the triangle pointer list buffer 940, or the triangle buffer 950.

Each vertex data structure 1500 may require sixteen bytes of memory space, according to embodiments of the invention. The first twelve bytes of the vertex data structure 1500 may contain information which identifies the coordinates (e.g., x-coordinate, y-coordinate, and z-coordinate) of a vertex within the three-dimensional scene. The vertex data structures may be sixteen byte aligned. Therefore, the address of each triangle vertex may be sixteen-byte aligned in memory (e.g., cache or system memory), according to embodiments of the invention. The final four bytes of the vertex data structure 1500 may be reserved for future use.

FIG. 16 illustrates an exemplary triangle properties data structure 1600. As illustrated, the triangle properties data structure 1600 may utilize thirty-two bytes of memory space. The image processing system may store a plurality of triangle properties data structures 1600 within a triangle properties buffer 970. The triangle properties buffer 970 may contain as many triangle properties data structures 1600 as there are triangles within the three-dimensional scene. However, according to embodiments of the invention, triangle properties data structures may be shared. For example, if two triangles have the same properties within the three-dimensional scene, the triangle data structures corresponding to those triangles may point to the same triangle properties data structure 1600 within the triangles properties buffer 970. Consequently, the triangles properties buffer 970 may contain fewer triangle properties data structures than triangles within the three-dimensional scene.

According to embodiments of the invention, different portions of the triangle properties data structure 1600 may store data for different properties of a triangle. For example, the first four bytes of triangle properties data structure 1600 may define an intrinsic color of the triangle. The next four bytes may identify, for example, a texture offset (e.g., in a texture buffer) indicating where a processing element performing image processing tasks may find a texture which is to be applied to the triangle. The next four bytes may identify, for example, a coefficient of reflection of the triangle, and a coefficient of refraction of the triangle. According to embodiments of the invention, the next two bytes of the triangle properties data structure may identify a coefficient of transparency of the triangle. The next two bytes of the triangle properties data structure 1600 may be reserved for future use. According to embodiments of the invention, the next sixteen bytes of the triangle data structure may be used to identify the coefficient of diffuse reflection ($K_d$) of the triangle, the coefficient of specular reflection ($K_s$) of the triangle, the coefficient of ambient reflection ($K_a$), and the Phong exponent (n) of the triangle.

CONCLUSION

By storing pointers in the spatial index to primitive defining information in buffers rather than storing the primitive information within spatial index, embodiments of the invention may reduce the size of the spatial index. Additionally, embodiments of the invention enable vertex and triangle sharing. Vertex and triangle sharing may reduce the amount of storage space required to define the primitives within the three-dimensional scene. Furthermore, the data organization provided by the embodiments of the invention allow for easy manipulation of the spatial index and primitive data.

While the foregoing is directed to embodiments of the present invention, other and further embodiments of the invention may be devised without departing from the basic scope thereof, and the scope thereof is determined by the claims that follow.

What is claimed is:

1. A method for generating a two-dimensional image of a three-dimensional scene containing at least one dynamic object, comprising:
   generating a spatial index having a world root node, internal nodes corresponding to bounding volumes with partitioned sub-volumes of the scene, and leaf nodes corresponding to unpartitioned sub-volumes of the scene containing primitive objects;
   generating, by operation of a computer processor, a leaf node link from at least one of the leaf nodes to a list of pointers to data objects corresponding to one or more primitive objects that represent the at least one dynamic object; and
   in response to a change in at least one of shape and location of the at least one dynamic object, updating one or more of the data objects to reflect the change without updating the leaf node link.

2. The method of claim 1, further comprising:
   in response to the at least one dynamic object moving out of an unpartitioned sub-volume corresponding to a leaf node, updating the leaf node link in that leaf node.

3. The method of claim 1, wherein the primitive objects contain a plurality of vertexes, and wherein a data object comprises one or more pointers to vertex data objects corresponding to primitive vertexes.

4. The method of claim 3, wherein two primitive objects share a vertex and data objects corresponding to the two primitive objects contain pointers which point to a single vertex data object.

5. The method of claim 3, wherein the vertex data object comprises the coordinates of the vertex within the three-dimensional scene.

6. The method of claim 1 wherein a data object comprises a pointer to a properties data object corresponding to at least one primitive property.

7. The method of claim 6, wherein two primitive objects have the same properties and data objects corresponding to the two primitive objects point to a single properties data object.

8. The method of claim 6, wherein the properties data object comprises information which identifies at least one of: a color of the primitive, a texture of the primitive, a coefficient of reflection for the primitive, a coefficient of refraction for the primitive, a coefficient of transparency for the primitive, a coefficient of diffuse reflection for the primitive, a coefficient of specular reflection for the primitive, a coefficient of ambient reflection for the primitive, and a phong exponent for the primitive.

9. The method of claim 1, wherein the primitive objects are triangles and the data objects are triangle data objects, and wherein the triangle data objects comprise one or more pointers to vertex data objects and at least one pointer to a triangle property data object in a triangle property buffer.

10. A method for generating and traversing a spatial index, comprising:
- generating a spatial index having a world root node representing a volume which encompasses a three-dimensional scene, internal nodes corresponding to bounding volumes with partitioned sub-volumes, and leaf nodes corresponding to unpartitioned sub-volumes containing primitive objects;
- generating links from the internal nodes to nodes corresponding to sub-volumes created by partitioning planes which partition the internal nodes;
- generating, by operation of a computer processor, a leaf node link from at least one of the leaf nodes to a list of pointers to data objects corresponding to one or more primitive objects contained within the sub-volume corresponding to the at least one leaf node;
- issuing a ray into the three-dimensional scene;
- traversing the ray through the spatial index to the at least one leaf node; and
- generating a pixel value based on primitive object information retrieved using the leaf node link.

11. The method of claim 10, further comprising:
- in order to determine if the ray intersects a primitive, taking the leaf node link from the at least one leaf node to the list of pointers to data objects corresponding to the one or more primitive objects contained within the sub-volume corresponding to the at least one leaf node.

12. The method of claim 11, wherein the primitive objects contain a plurality of vertexes, and wherein a data object comprises one or more pointers to vertex data objects corresponding to primitive vertexes and at least one pointer to a properties data object corresponding to at least one primitive property.

13. An image processing system comprising:
- a physics engine to move one or more dynamic objects in an animated scene; and
- logic configured to generate a spatial index having a world root node, internal nodes corresponding to bounding volumes with partitioned sub-volumes, and leaf nodes corresponding to unpartitioned sub-volumes containing primitive objects; generate a leaf node link from at least one of the leaf nodes to a list of pointers to data objects corresponding to one or more primitive objects that represent a dynamic object of the one or more dynamic objects; and in response to a change in at least one of shape and location of the one or more dynamic objects, update one or more of the data objects without updating the leaf node link.

14. The image processing system of claim 13, wherein the logic is further configured to update the leaf node link from a leaf node in response to the dynamic object moving out of an unpartitioned sub-volume corresponding to the leaf node.

15. The image processing system of claim 13, wherein the primitive objects contain a plurality of vertexes, and wherein a data object comprises one or more pointers to vertex data objects corresponding to primitive vertexes.

16. The image processing system of claim 15, wherein two primitive objects share a vertex and data objects corresponding to the two primitive objects contain pointers which point to a single vertex data object.

17. The image processing system of claim 15, wherein the vertex data object comprises the coordinates of the vertex within the three-dimensional scene.

18. The image processing system of claim 17, wherein two primitive objects have the same properties and data objects corresponding to the two primitive objects point to a single properties data object.

19. The image processing system of claim 15, wherein the properties data object comprises information which identifies at least one of a color of the primitive, a texture of the primitive, a coefficient of reflection for the primitive, a coefficient of refraction for the primitive, a coefficient of transparency for the primitive, a coefficient of diffuse reflection for the primitive, a coefficient of specular reflection for the primitive, a coefficient of ambient reflection for the primitive, and a phong exponent for the primitive.

20. The image processing system of claim 13, wherein a data object comprises a pointer to a properties data object corresponding to at least one primitive property.

* * * * *